(12) United States Patent
Isoda

(10) Patent No.: US 11,290,343 B1
(45) Date of Patent: Mar. 29, 2022

(54) SYSTEM AND METHOD FOR ASSET AND DATA MANAGEMENT

(71) Applicant: Hitachi, Ltd., Tokyo (JP)

(72) Inventor: Yuya Isoda, Milpitas, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/117,974

(22) Filed: Dec. 10, 2020

(51) Int. Cl.
| | |
|---|---|
| *H04L 12/24* | (2006.01) |
| *H04L 41/14* | (2022.01) |
| *H04L 41/085* | (2022.01) |
| *H04L 41/12* | (2022.01) |

(52) U.S. Cl.
CPC .......... *H04L 41/145* (2013.01); *H04L 41/085* (2013.01); *H04L 41/12* (2013.01)

(58) Field of Classification Search
CPC ...... H04L 41/145; H04L 41/12; H04L 41/085
See application file for complete search history.

(56) References Cited

U.S. PATENT DOCUMENTS

| | | | | |
|---|---|---|---|---|
| 10,025,653 | B2* | 7/2018 | Goldstein | G06Q 50/04 |
| 2001/0056481 | A1* | 12/2001 | Hayball | H04L 41/024 |
| | | | | 709/223 |
| 2016/0154907 | A1* | 6/2016 | Halabe | E21B 43/00 |
| | | | | 703/7 |
| 2017/0293418 | A1* | 10/2017 | Hams | G05B 19/418 |
| 2020/0265329 | A1* | 8/2020 | Thomsen | G06N 20/10 |

FOREIGN PATENT DOCUMENTS

| | | | | |
|---|---|---|---|---|
| WO | WO-2020076998 | A1 * | 4/2020 | H04L 67/125 |
| WO | WO-2020198249 | A1 * | 10/2020 | G05B 23/0221 |

* cited by examiner

*Primary Examiner* — Nam T Tran
(74) *Attorney, Agent, or Firm* — Procopio, Cory, LLP

(57) ABSTRACT

Example implementations described herein disclose an asset and data management method on digital twin that provides an integration method between asset layouts and data layouts. Using the integrated layout, the example implementations described herein provide understanding a relationship between asset and data to improve the asset utilization/efficient (e.g. manufacturing efficient) for increasing revenue.

12 Claims, 25 Drawing Sheets

Asset Layout Settings 5110
Name: Physical Asset Layout
Layout Definition: "Region: ($country, USA)", "Building: ($building, ABC)", "Equipment.GW: ($equipment, GW_O)", "Equipment. PLC: ($equipment,)", "Equipment: ($equipment,)"
Target Data: Planning Data Name: Logical Asset Layout
Layout Definition: "Product:: ($product,)", °"Region: ($country,)". "Building: ($building, '"Line.: ($line.) ', '"Operation :($operation,)", ..-Equipment: ($equipment,)"
Target Data: Manufacturing Data
Version Management "Yes: YYYY/MM/DD HHMMSS"
Automatic Generation: Yes

Storage layout Settings 5120
Target Data: Planning Data
Storage Location: Cloud Storage / Planning Data /
Partition Definition: "Synchronize: Physical Asset Layout "
Target Data: Manufacturing Data
Storage Location: Local Storage | Manufacturing Data |
Partition Definition: "Synchronize: Logical Asset Layout", "Exclude: Region, Building"
Target Data: Physical }Asset Layout
Storage Location: Cloud Storage / Layout |
Partition Definition: "Region: ($country, USA)", "Building :($building, ABC)", "Layout: (, Asset)","Name:($name, )"
Target Data: Logical Asset Layout
Storage Location: Cloud Storage / Layout |
Partition Definition: "Region: ($country. USA)'» "Building: ($building. ABC)"."Layout: (, Asset)"."Kame:($name, )'
Target Data: Logical Asset layout
Storage Location: Cloud Storage | Layout |
Partition Definition: "Region: ($country .USA}'. "Building: ($building. ABC)"."Layout: (, Data)". "Name: ($name, )» "Type:($type. )"
Target Data: Digital Twin Layout
Storage Location: Cloud Storage | Layout |
Partition Definition: "Region: ($country .USA)'. "Building :($building, ABC)", "Layout: (, Integrated)"."Name: ($name.)
Time series Partition "Yes: YYYY/MM/DD HHMMSS"
Automatic Generation: Yes

Status Management Settings 5130
Name: Line Status
Target Data: Planning Data, Manufacturing Data
Layout Definition: "Date: ($date, )", "Line: ($line. )"."Operation: ($operation, )","Equipment: ($equipment, )". "Data: ($data, )". "Status:($status,)"
Automatic Generation: Yes

Data Layout Settings 5140
Name: Logical Data Layout
Target Data: Manufacturing Data
Layout Separator: Logical Asset Layout
Status Separator: Line Status
Layout Definition: "Synchronize: Logical Asset Layout", "Exclude: Region. Building"
Additional Layout Definition: "Bottom Layer: Status:($status,)"
Hierarchical Data Catalog:
"Equipment ALL: UNION ALL EXCLUDE NODE. value != 'Broken Record' ", "
Operation :ALL: UNION ALL",
"Line: NODE. value IN (OP210. OP220, OP230. OP240): LEFT OUTER JOIN ON OP210.Productid = OP220.Productid = OP230.Productid = OP240.Productid"
Automatic Generation: Yes

Integration Management Settings 5150
Name: Digital Twin Layout
Asset Layout: Logical Asset Layout
Data Layout: Logical Data
Automatic Generation: Yes

FIG. 3

SYSTEM AND METHOD FOR ASSET AND DATA MANAGEMENT

BACKGROUND

Field

The present disclosure is directed generally to asset management systems, and more specifically, to asset and data management for automotive and manufacturing systems.

Related Art

The automotive market is growing due to demand for connected vehicles. However, the connected technologies (e.g. assisted/self-driving) are of a safety-critical nature and defects in these systems may lead to accidents, claiming liabilities for OEMs (Original Equipment Manufacturer) and their suppliers.

The production of vehicles using a standardized platform is a key trend that is utilized in the automobile industry. The standardization of the OEM platform has significant potential to lower costs and increase flexibility, but is also accompanied by increased complexity of the supply chain and quality control. In contrast, the stricter/more extended regulation may increase the size and frequency of recalls in many countries.

Therefore, the standardization products manufactured by mega platforms pose the accumulation loss potential, as well as the risk of major product recalls. In response, OEMs are called upon for tighter contractual responsibility from their maker for potential product liability, warranty and recall claims.

In the related art, there is a system and method that is configured to modify data ingestion at an asset-monitoring system based on a predictive model. The asset-monitoring system may execute a predictive model that outputs an indicator of whether at least one event from a group of events (e.g. a failure event) is likely to occur at a given asset within a given period in the future. Based on the output of this predictive model, the asset-monitoring system may modify one or more operating parameters for ingesting data from the given asset, such as a storage location for the ingested data, a set of data variables from the asset that are ingested, and/or a rate at which data from the asset is ingested.

SUMMARY

Example implementations described herein are directed to the data management by using the data catalog on the data lake. The manufacturing industry requests simple, inexpensive, and management-less service. There is a need to understand the premise of the manufacturing industry that updates (e.g. repair, replace, add, delete) the processes (e.g. equipment, parameter of equipment) frequently. There is a need to flexible data management that manages the manufacturing data and the event on time-series.

Example implementations described herein involve a data catalog management method on data lake that manages manufacturing data every manufacturing event (activity).

The premise of manufacturing industry updates (e.g. repair, replace, add, delete) the process (e.g. equipment, parameter of equipment) frequently. This means that the user needs to build a flexible data management that manage the manufacturing data and the event on time-series. For the reason, the related art can manage data management (e.g. location, parameters) for every predicted event (e.g. failure) from data but it cannot manage data management and data access method for every activity (e.g. changing parameters, replacing equipment, and so on. For example, the related art implementations cannot predict (detect) the event and control data management at the event of changed equipment.

Moreover, in the related art implementations, the user cannot understand how/where the equipment generated the data. Further, the data administrator transforms (e.g., extract, transform, load, or ETL) the data into a data mart to utilize the data for an application. The application user may not be able to understand how/where the equipment generated the data.

Example implementations involve a data management system that divides data for every activity for data ingestion, and integrates the same activity data for data access. Further, the data management must integrate data with the asset for understanding the bidirectional data flow (e.g., worker and application user views).

Aspects of the present disclosure can involve a method for management of a plurality of systems comprising a plurality of sensors, the method involving relating an asset layout of the plurality of systems with a data layout of the plurality of systems, the asset layout managing the plurality of systems at an equipment level, a line level and an operation level, the data layout managing data catalogs at the equipment level, the line level, and the operation level.

Aspects of the present disclosure can involve a computer program, for management of a plurality of systems comprising a plurality of sensors, the computer program having instructions involving relating an asset layout of the plurality of systems with a data layout of the plurality of systems, the asset layout managing the plurality of systems at an equipment level, a line level and an operation level, the data layout managing data catalogs at the equipment level, the line level, and the operation level. The computer program can be stored on a non-transitory computer readable medium and executed by one or more processors.

Aspects of the present disclosure can involve a system for management of a plurality of systems comprising a plurality of sensors, the system involving means for relating an asset layout of the plurality of systems with a data layout of the plurality of systems, the asset layout managing the plurality of systems at an equipment level, a line level and an operation level, the data layout managing data catalogs at the equipment level, the line level, and the operation level.

Aspects of the present disclosure can involve an apparatus configured to facilitate management of a plurality of systems comprising a plurality of sensors, the apparatus involving a processor, configured to relate an asset layout of the plurality of systems with a data layout of the plurality of systems, the asset layout managing the plurality of systems at an equipment level, a line level and an operation level, the data layout managing data catalogs at the equipment level, the line level, and the operation level.

BRIEF DESCRIPTION OF DRAWINGS

FIG. 3 illustrates an example of a configuration file, in accordance with an example implementation.

DETAILED DESCRIPTION

Figure 1A:
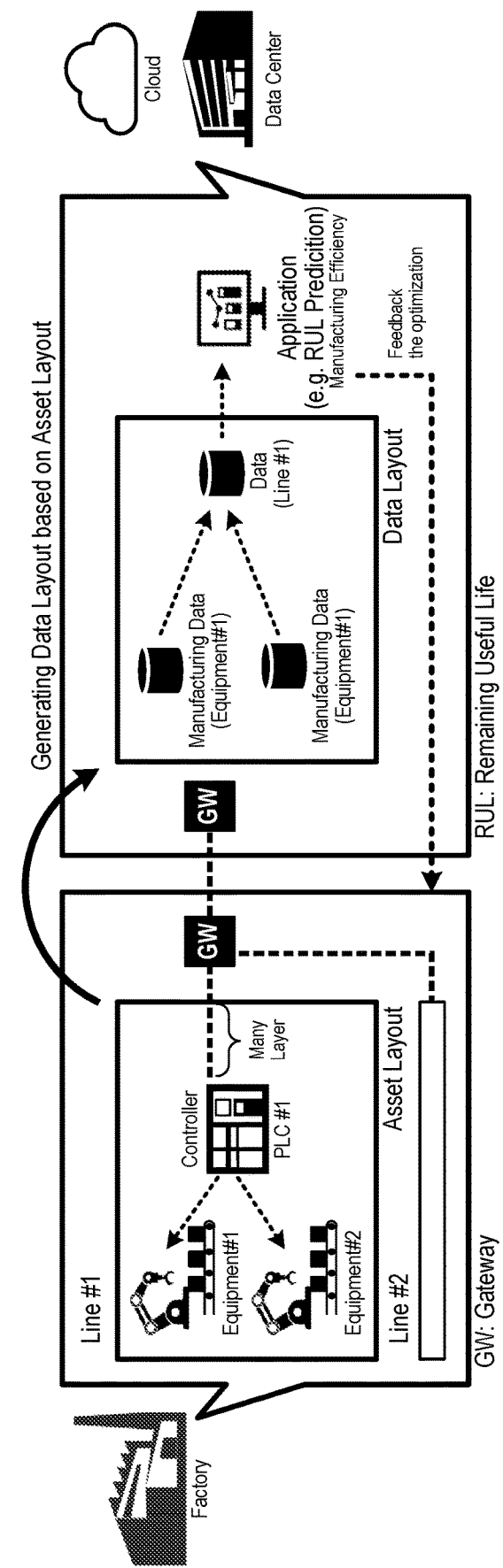
FIG. 1(A) illustrates an example overall industrial Internet of Things (IoT) platform for data management, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein are directed to synchronizing each layout for each activity event, including the Physical Asset Layout (PAL), Logical Asset Layout (LAL), and Data Layout which contrast with the LAL. Example implementations manage the digital twin for data management synchronizing with the Asset Layout and Data Layout.

Example implementations integrate asset layouts (1 . . . N) and data layouts (1 . . . N) into integrated layouts (1 . . . N) to search components (e.g. asset, data, application) from asset (application) to application (asset). Then, the user can optimize the asset utilization (e.g. parameter, structure) to improve the asset efficiency (e.g. manufacturing efficiency) based on an application results.

In example implementations, the asset layout is generated hierarchically from asset data (e.g. manufacturing data, planning data). The hierarchy is defined by automatically or user definition.

Figure 1B:
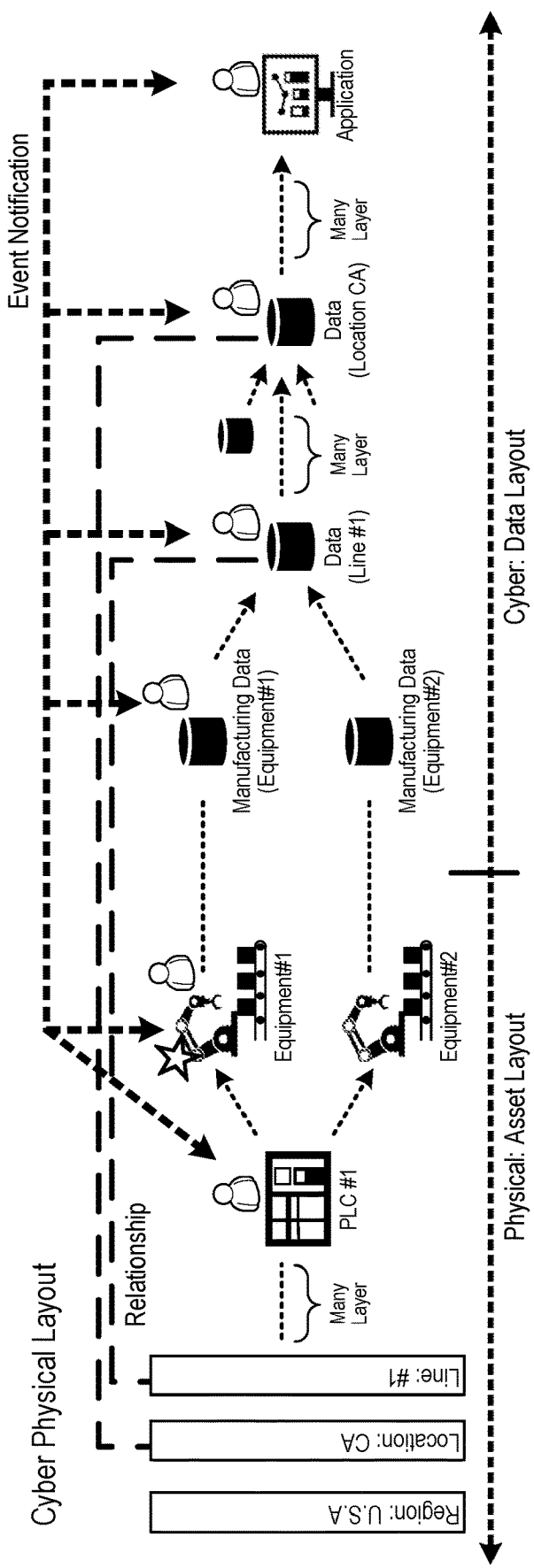
FIG. 1(B) illustrates a cyber physical layout, in accordance with an example implementation.

FIG. 1(B) illustrates a cyber physical layout, in accordance with an example implementation. The example implementations described herein address the above issues through the use of a cyber physical layout management and event notification.

Further, in example implementations, the status manager manages the status history based on data status and the layout changes.

In example implementations, the data catalog manager classifies data by data status and/or the layout to relate a classified data to a data catalog on a data layout. Further, data catalog manager generates hierarchical data catalogs and a data layout based on the asset layout, user definition or the asset data (planning, manufacturing and/or sensing data). In this process, if the data belongs to two or more data catalogs, the data catalog manager divides the data by data status and/or the layout and re-storages divided data into other storage locations.

Integration Manager searches the available connecting nodes between the asset and the data layouts to integrate different layouts by nodes or layout based on automatically or user definition.

FIG. 1(A) illustrates an example overall industrial IoT platform for data management, in accordance with an example implementation. In the example implementation of FIG. 1(A), the left side is the factory and the right side is a data center or cloud platform. In the factory, there can be several pieces of equipment manufacturing products under the manufacturing plan. The asset layout is a connection graph between machines and/or software, which can be in the form of a general model based on ISA95.

In this example, there are programmable logic controllers (PLCs) and equipment. The equipment generates manufacturing data, which is uploaded to a data center or a cloud. In the data center, the user can process the data from raw data to data for an application. To facilitate this aspect, the process can involve data collection, data cleansing, and data generation for each application. The user can thereby obtain improved knowledge from the application and provide optimized parameters as feedback.

In such systems, the user may not understand the relationship between the assets (e.g., asset layout) and the data (e.g., data layout). Thus, such users may need to contact many managers responsible for data intake or various equipment, which can be very time consuming.

If the equipment is replaced/repaired/updated with new firmware, then the data structure (schema) may be updated in the manufacturing data. Such an event may cause application errors from the new data. Therefore, users need to notice the data structure change in the real-time.

Firstly, it integrates asset and data layout into cyber-physical layouts for interactive searching components (e.g., asset, data, application) between asset and data layout or asset and application. Therefore, a user can know the relationship between asset and data, and the user optimizes the asset utilization to improve the efficiency based on application results.

Secondly, if event notification detects the event (e.g. machine malfunction/replacement, data structure/status change) using a cyber-physical layout, it notifies the event to the related asset or data users.

Figure 1C:
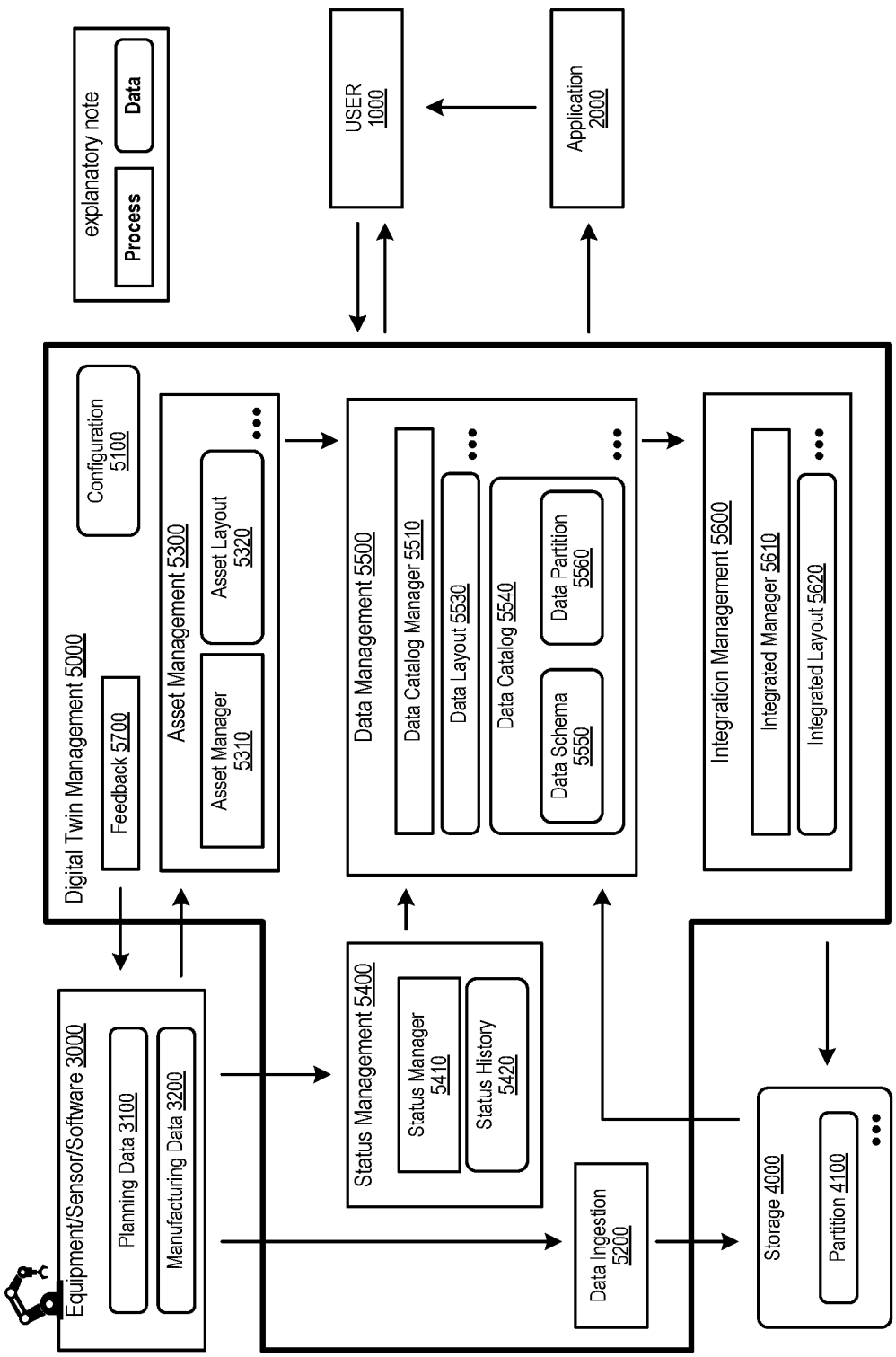
FIG. 1(C) illustrates a system architecture overview, in accordance with an example implementation.

FIG. 1(C) illustrates a system architecture overview, in accordance with an example implementation. In the example implementation described herein, there is a digital twin management system 5000, which interfaces with the user 1000 through application 2000, and processes data from equipment/storage/software 3000 for storage into storage system 4000.

Equipment/storage/software 3000 is configured to provide planning data 3100 and manufacturing data 3200 through data ingestion 5200 to be stored into storage system 4000 in the corresponding partition 4100, and also to asset management 5300. Feedback 5700 can be received from digital twin management 5000 to be incorporated into the corresponding machine.

Digital twin management system 5000 can involve various management systems, such as asset management 5300, status management 5400, data management 5500, and integration management 5600. Asset management 5300 manages asset layout 5320 through asset manager 5310. Further detail of asset management 5300 is described with respect to FIGS. 4-5. Status management 5400 manages status history 5420 through status manager 5410.

Data management 5500 manages data layout 5530 and data catalog 5540 through data catalog manager 5510. Data catalog 5540 manages data schema 5550 and data partition 5560.

Integration management 5600 includes integrated manager 5610 and integrated layout 5620.

Figure 1D:
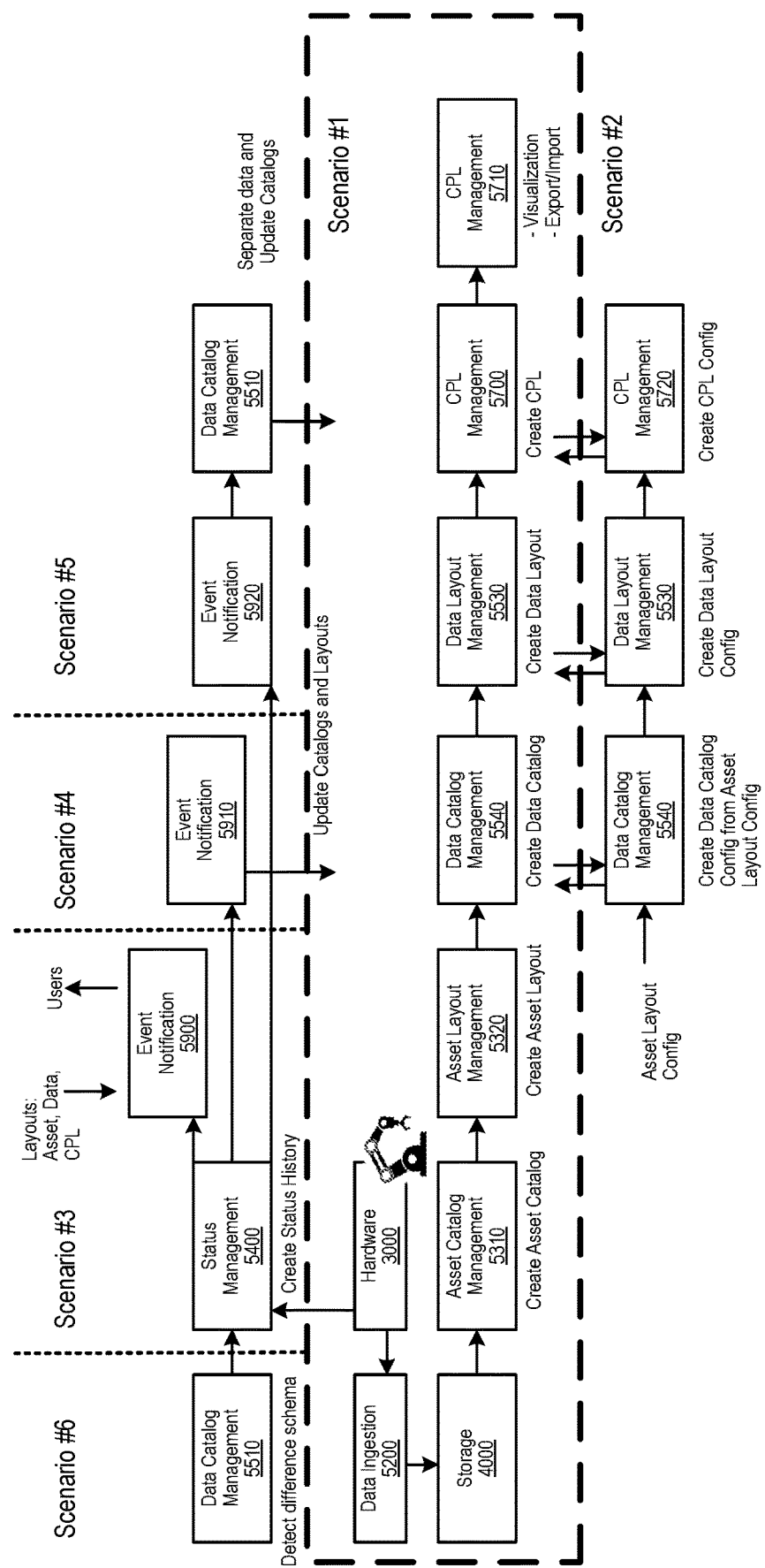
FIG. 1(D) illustrates an example of the process flow overview, in accordance with an example implementation.

FIG. 1(D) illustrates an example of the process flow overview, in accordance with an example implementation. In the process flow, there are six different scenarios that can be implemented to facilitate the cyber physical layout (CPL) and implementations therein.

Figure 1E:
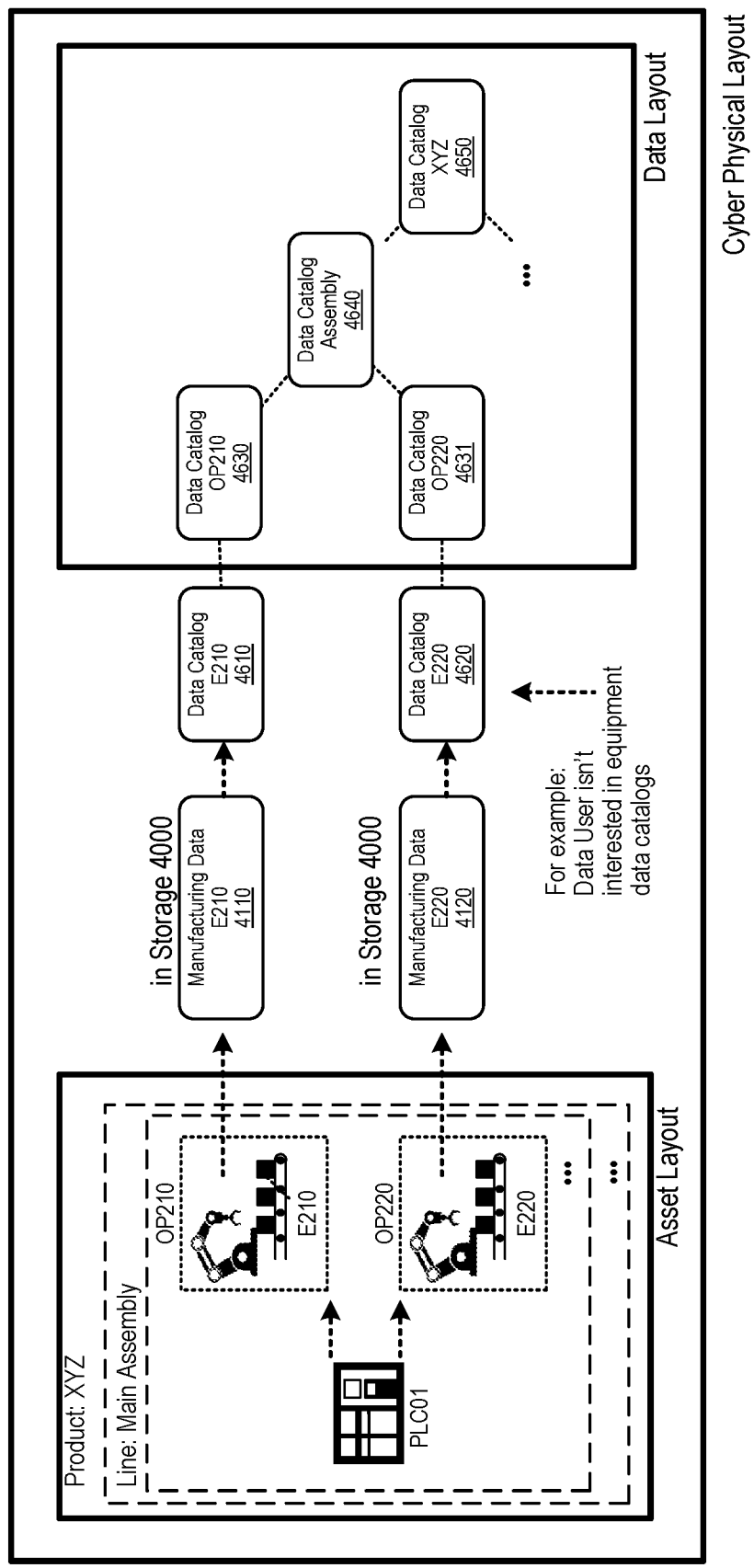
FIGS. 1(E) and 1(F) illustrate an example formation of the cyber-physical layout, in accordance with an example implementation.
Figure 1F:
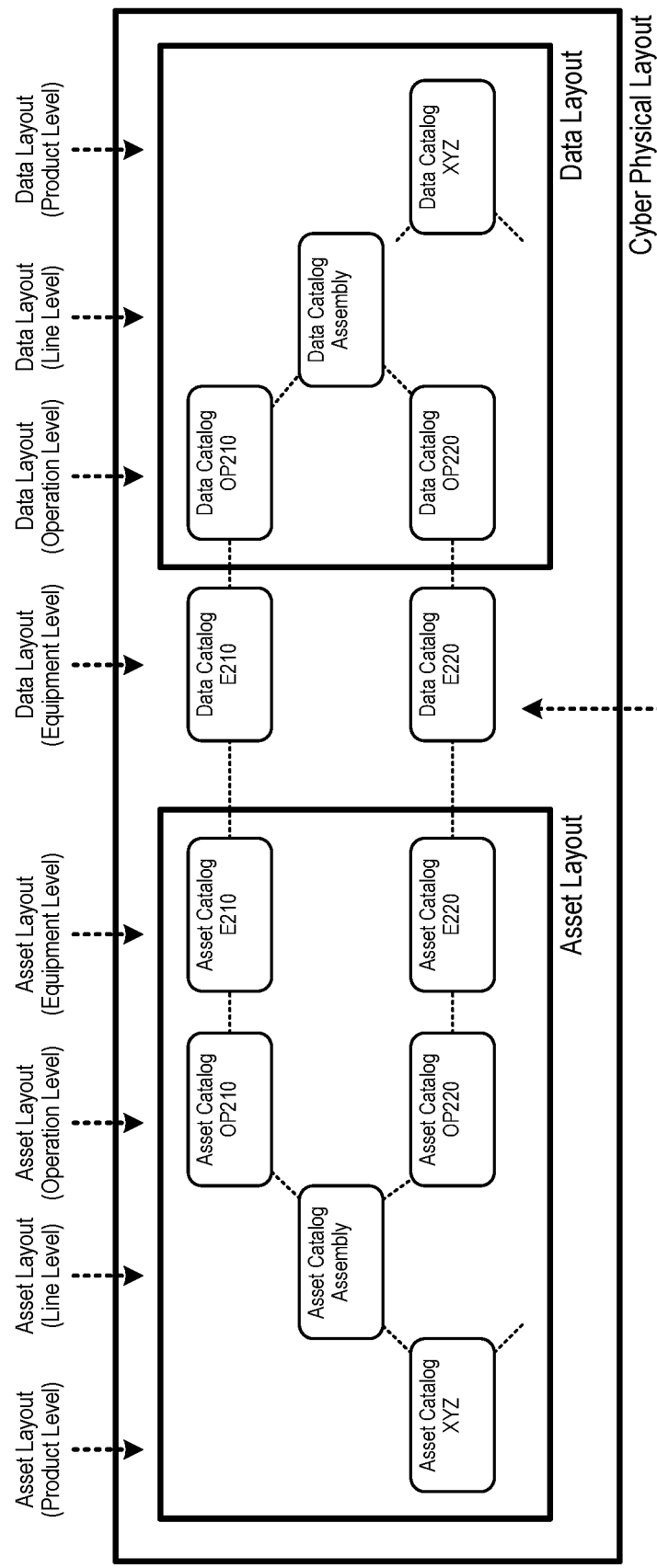

In a first example scenario, the data layout (DL) is related to the asset layout (AL) to form the CPL. That is, the asset manager 5310 creates the asset catalog based on data in storage 4000 that was ingested from hardware 3000 by data ingestion 5200. The asset layout 5320 is created by asset manager 5310. Similarly, the data catalog manager 5510 creates the data catalog 5540 and the data layout 5530 from using a cascade, which is then used to create the CPL through CPL management 5700. Further, the CPL management can generate the CPL graph for visualization at 5710 as shown at FIGS. 1(E) and 1(F). In a second example scenario, the data catalog 5540 and the data layout 5530 are created from the asset layout itself, which is then used to form the CPL 5720. In a third example scenario, the event notification 5900 notifies the users of the catalog of a status change event from using the layouts and manages status of the hardware accordingly through status management 5400. In a fourth example scenario, event notification 5910 updates catalogs and layouts when detecting the status change event. In a fifth scenario, the data catalog management 5510 divides the data into the corresponding status and creates/updates the data catalog upon an event notification 5920. In a sixth scenario, the data catalog management 5510 divides data into difference schema and creates/updates the data catalog.

FIGS. 1(E) and 1(F) illustrate an example formation of the cyber-physical layout, in accordance with an example implementation. In the example of FIG. 1(E), the asset layout is linked together with the data layout to form the cyber-physical layout. From the asset layout, equipment E210 and E220 are used to form manufacturing data 4110 and 4120. Such data can be retrieved from storage 4000 to form the equipment data catalogs 4610 and 4620. If, for example, the underlying user is not interested in the equipment data catalogs and desires the data catalogs for assets higher up in the asset hierarchy, then the data layout can link the equipment data catalogs 4610 and 4620 to data catalogs along the asset hierarchy, such as the operational data catalog 4630, 4631, the assembly catalog 4640, the product catalog 4650, and so on in accordance with the desired implementation. As illustrated in FIG. 1(F), the asset layout can organize the asset catalogs by their different asset hierarchy levels (e.g., product level, line level, operation level, equipment level) which is linked to the data layout which also organizes the data catalog by asset hierarchy. In this example, should the user not have interest in the equipment level data catalogs, the equipment level data catalogs can be omitted from the cyber physical layout, whereupon the asset layout is linked to the data layout at the data catalogs of the operation level. Further examples of the asset layout hierarchy are provided with respect to FIG. 2.

Figure 1G:
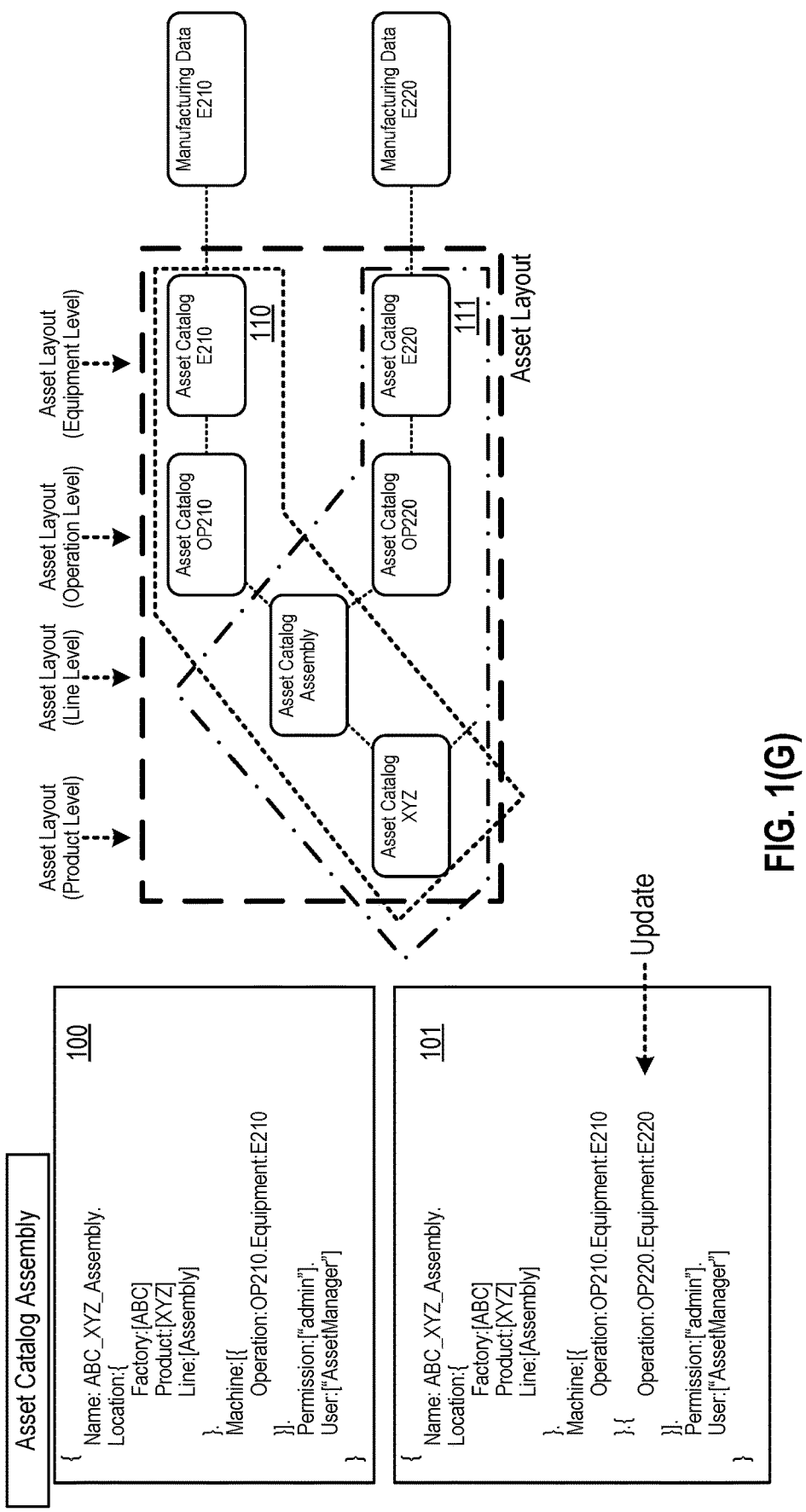
FIG. 1(G) illustrates an example of execution by asset layout management, in accordance with an example implementation.

FIG. 1(G) illustrates an example of execution by asset layout management 5300, in accordance with an example implementation. In the example of FIG. 1(G), suppose that the asset catalog assembly has conducted data intake from the equipment and generated the asset catalog shown at 100. Based on the asset catalog assembly, the asset layout at 110 is constructed. At a subsequent time, suppose the asset catalog assembly has conducted data intake from the equipment and generates an update to the asset catalog shown at 101. In response, the asset layout can be updated according to the asset layout hierarchy and from the updated asset catalog to form the update shown at 111.

Figure 1H:
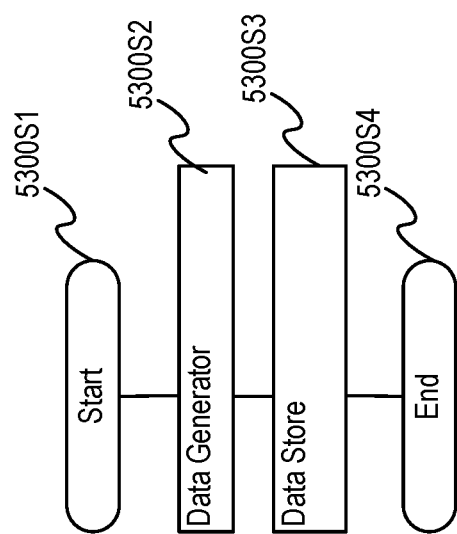
FIG. 1(H) illustrates an example flow diagram of asset layout management 5300, in accordance with an example implementation.

FIG. 1(H) illustrates an example flow diagram of asset layout management 5300, in accordance with an example implementation. The flow starts at 5300S1. At 5300S2, data generator function is conducted by the asset layout management to generate the asset catalog that forms the asset layout. At 5300S3, the data store function is conducted to store the generated asset layout. This step stores the asset layouts if they are new, and if they are directed to existing asset layouts, then to update the asset layout in storage as illustrated in FIG. 1(G). At 5300S4, the flow ends.

Figure 1I:
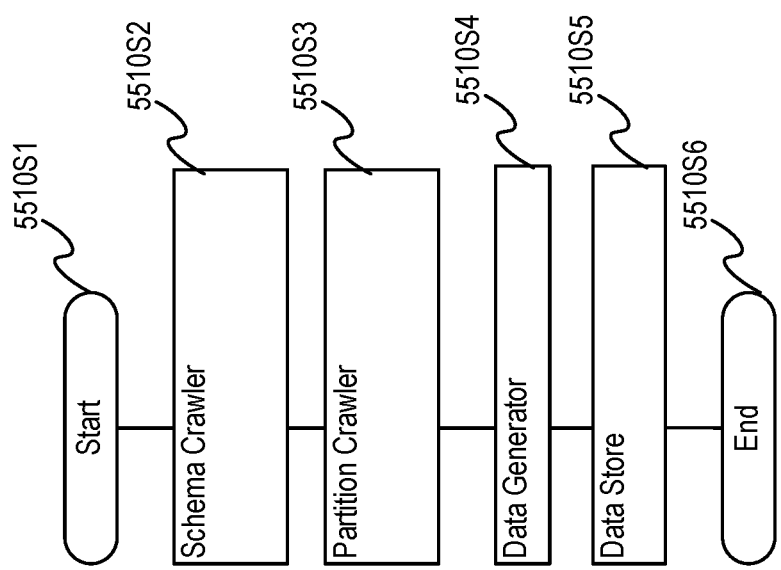
FIG. 1(I) illustrates an example flow of data catalog management 5510, in accordance with an example implementation.

FIG. 1(I) illustrates an example flow of data catalog management 5510, in accordance with an example implementation. The flow starts at 5511S 1. At 5511S2, the schema crawler function in data catalog 5510 are executed to extract a data structure as a schema from the manufacturing data. If the function is to be executed in a cascading manner, then this function assigns other schemas to the schema of the data catalog.

At 5511S3, the partition crawler of the data catalog management is executed to extract a file path as a partition from the storage 4000. If it is to be executed in a cascading manner, then other partitions are assigned to the partition the data catalog. At 5511S4, the data generator function is executed to generate the data catalogs. At 5511S5, the data store function is utilized to store data catalogs or update existing data catalogs. At 5511S6, the flow ends.

Figure 1J:
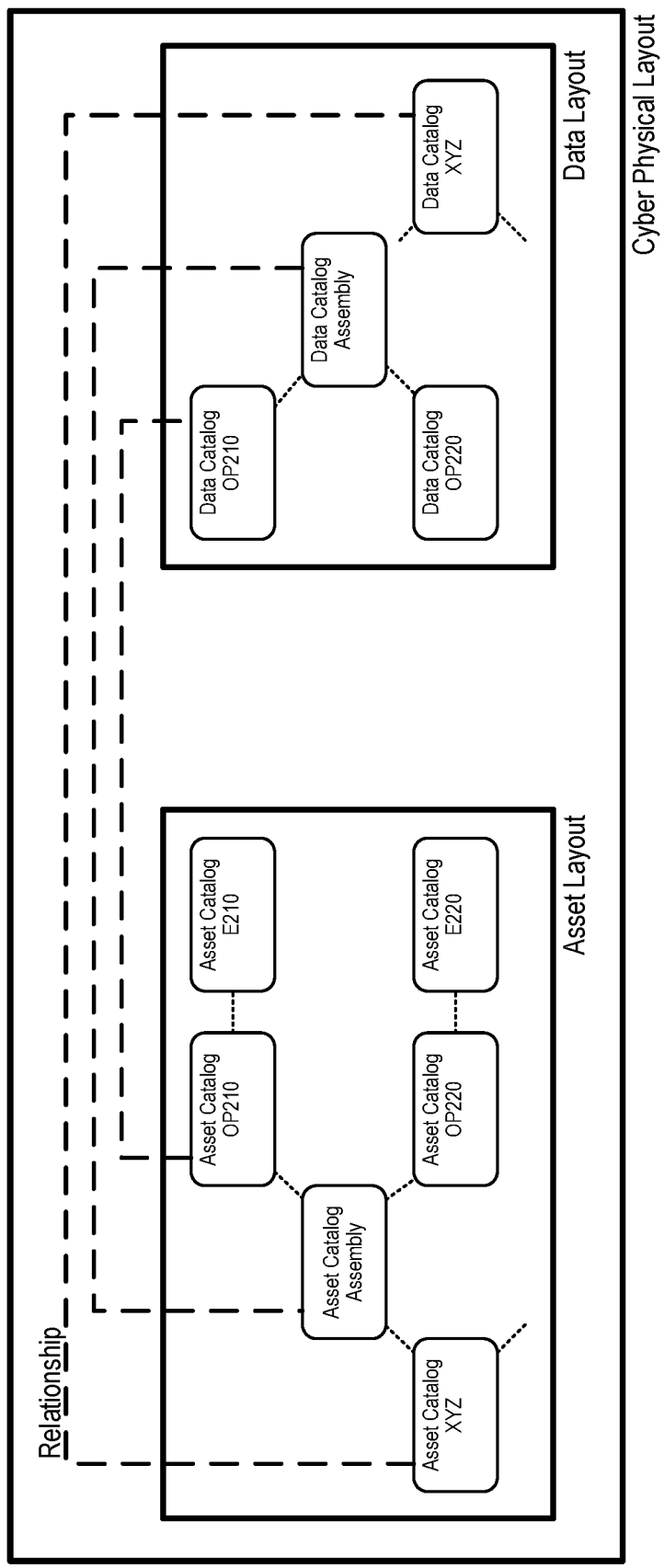
FIG. 1(J) illustrates an example of the cyber physical layout that is output from the processes and examples illustrated from FIGS. 1(E) to 1(I).

FIG. 1(J) illustrates an example of the cyber physical layout that is output from the processes and examples illustrated from FIGS. 1(E) to 1(I). Specifically, FIG. 1(J) illustrates the relationships between the asset layout and the data layout as managed by the cyber physical layout. Through the example implementations described herein, users can know the relationship between the data and the assets even when changes to the underlying assets are made. Further details of each of these example implementations are provided herein.

Figure 2:
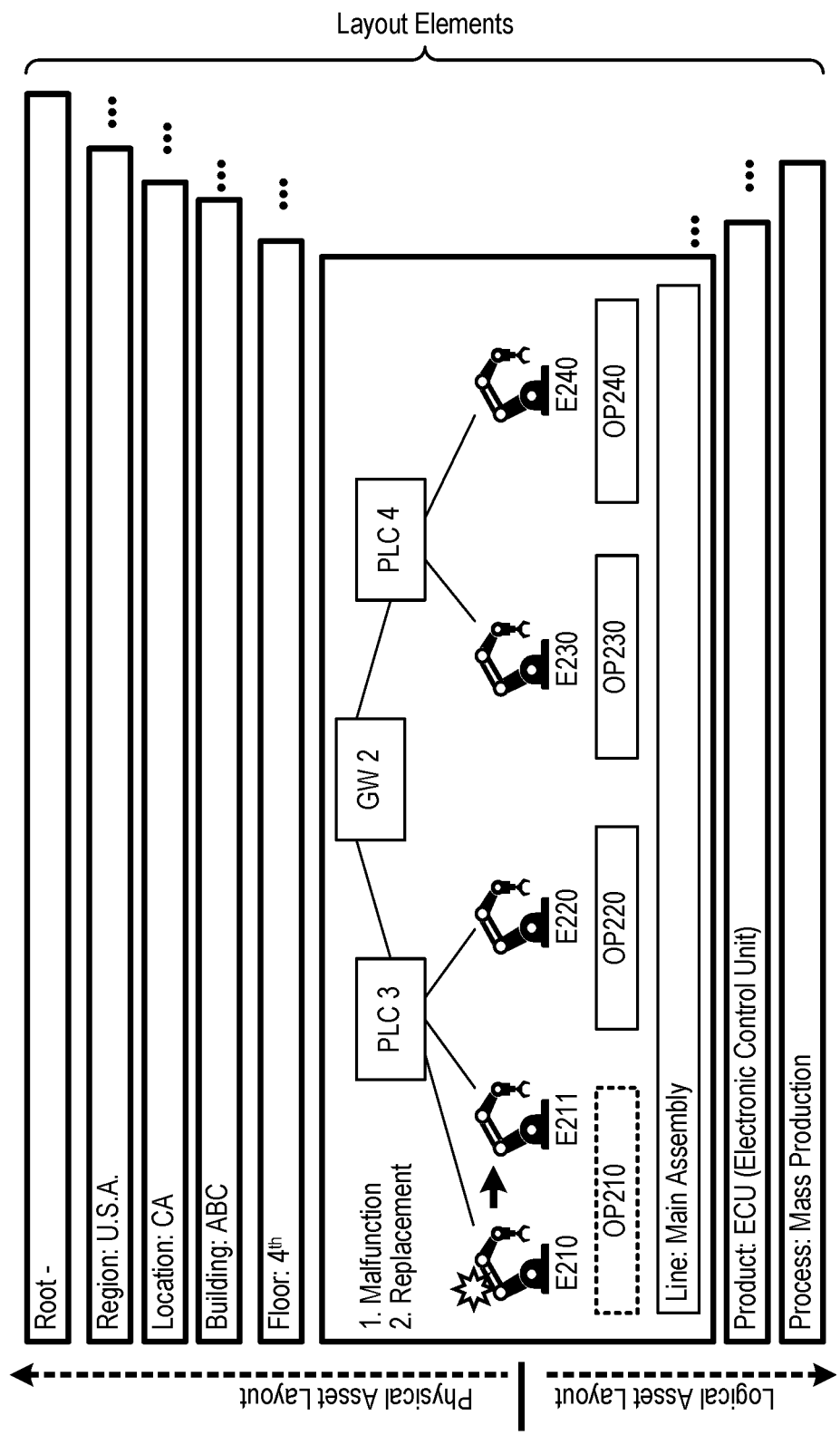
FIG. 2 illustrates an asset layout hierarchy, in accordance with an example implementation.

FIG. 2 illustrates an asset layout hierarchy, in accordance with an example implementation. Example implementations described herein are directed to the linking of the layout elements between the logical asset layout and the physical asset layout to create a cyber asset layout. Logical asset layout can include the process executed by the asset, the product being formed, the part of the line the asset is implemented on the factory floor, the operation mode of the asset, and the asset/equipment identifier. Physical asset layout can include the asset/equipment identifier, the programmable logic controllers (PLCs) identifiers, the gateway (GW) identifiers, and physical location parameters, such as region, location, building, floor, and so on. In the example of FIG. 2 that is used herein, equipment E210 is configured to conduct operation OP210 and operates on programmable logic controller PLC 3 connected to gateway GW 2. Equipment E210 has undergone a malfunction and is replaced by equipment E211.

FIG. 3 illustrates an example of a configuration file, in accordance with an example implementation. Specifically, FIG. 3 illustrates configuration file 5100 from FIG. 1, which includes settings and default assignments, wherein the elements are built from left to right in the example of FIG. 3.

Configuration file 5110 can involve various settings such as asset layout settings 5110, storage layout settings 5120, status management settings 5130, data layout settings 5140, and integration management settings 5150. In an example of asset layout settings 5110, there is the name of the layout, the layout definition, the target data, for the layout, and other settings such as version management and whether the asset layout to be automatically generated.

In an example of storage layout settings 5120, there is target data, storage location, partition definition, and other settings, such as time series partition and whether the storage layout is to be automatically generated.

In an example of status management settings 5130, there is the name of the setting, target data, layout definition, and other settings such as whether the status management is to be automatically generated.

In an example of data layout settings 5140, there can be the name, target data, layout separator, status separator, layout definition, additional layout definitions, hierarchical data catalog, and other settings such as whether the data layout is to be automatically generated.

Figure 4:
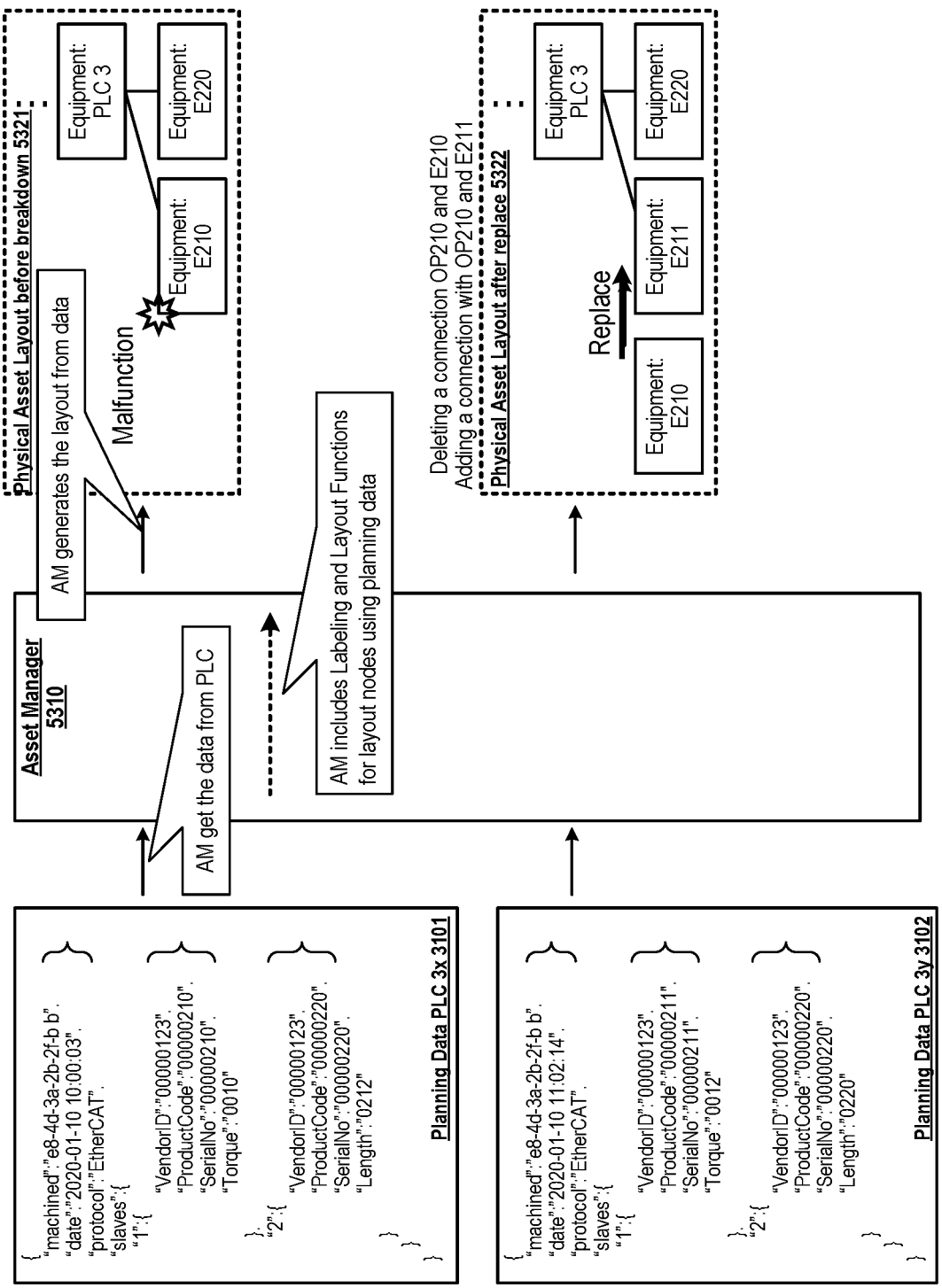
FIG. 4 illustrates an overview of the asset manager for planning data, in accordance with an example implementation.

FIG. 4 illustrates an overview of the asset manager for planning data, in accordance with an example implementation. Specifically, FIG. 4 illustrates an example execution of asset management 5300 and interactions between asset manager 5310 and asset layout 5320 based on intake of planning data 3100 from the equipment/sensor/software 3000. Planning Data 3101 is an example of planning data received from PLC 3 of FIG. 2 at time x. The asset manager 5310 obtains the planning data 3101 and utilizes labeling and layout functions for layout nodes by using the received planning data. Asset manager 5310 then generates the layout from the planning data to form the physical asset layout before the breakdown 5321 (before the malfunction of equipment E210 from the example of FIG. 2). During the operation of OP210, equipment E210 undergoes a malfunction. Subsequently, at time y (after the replacement of the equipment E210 with equipment E211 of FIG. 2), Planning data 3102 is received from PLC 3 by the asset manager 5310. Asset manager 5310 processes the planning data 3102 of equip Planning Data PLC 3y 3102, to generate the physical asset layout after replacement 5322. Thus, the asset manager 5310 is informed of the replacement of equipment E210 with equipment E211 as illustrated in the example of FIG. 2, and thereby deletes the connection between equipment E210 and operation OP210 and PLC 3, and establishes a new connection between equipment E211, operation OP210 and PLC 3.

Figure 5:
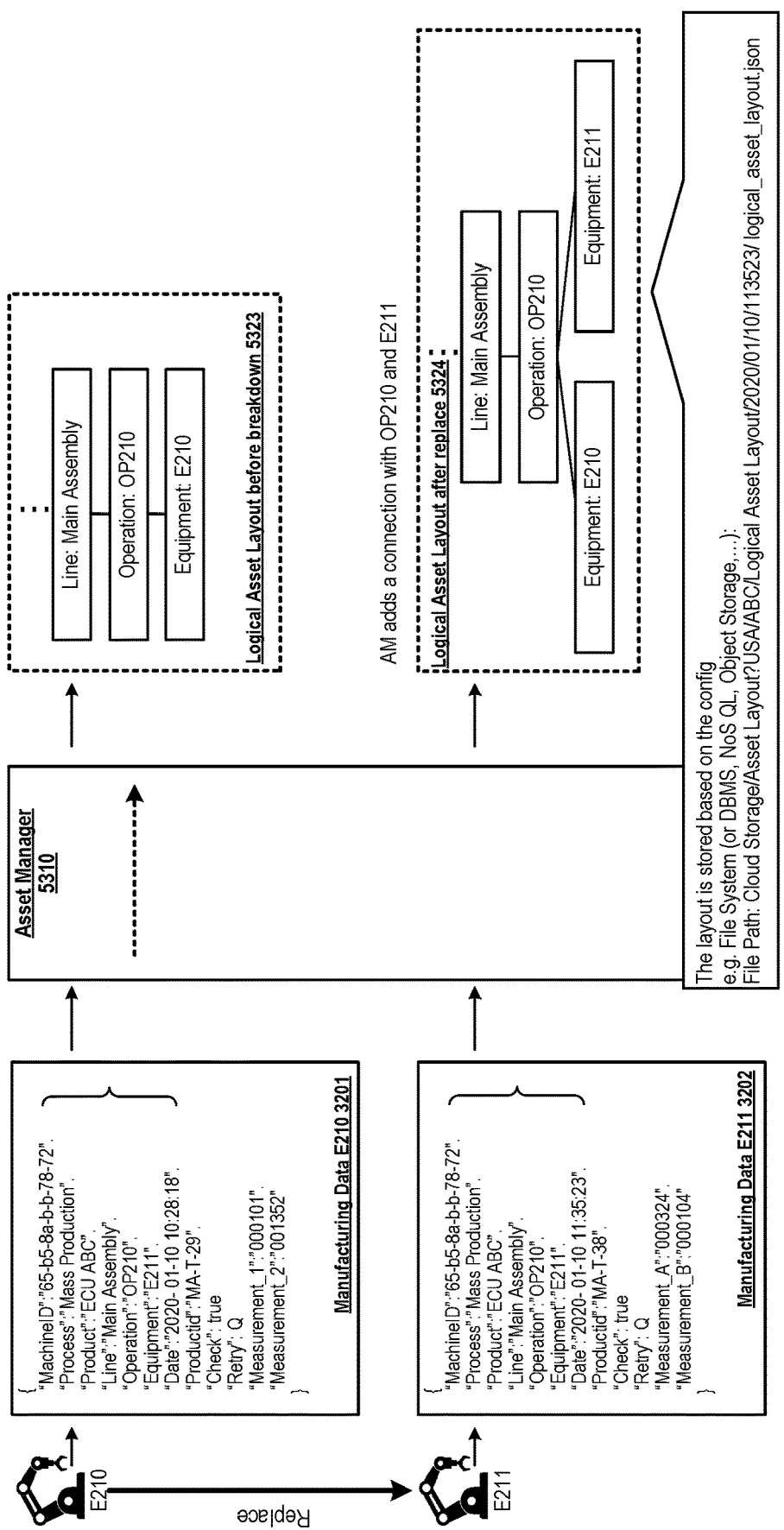
FIG. 5 illustrates an overview of the asset manager for manufacturing data, in accordance with an example implementation.

FIG. 5 illustrates an overview of the asset manager for manufacturing data, in accordance with an example implementation. Specifically, FIG. 5 illustrates an example execution of asset management 5300 and interactions between asset manager 5310 and asset layout 5320 based on intake of manufacturing data 3200 from the equipment/sensor/software 3000. At first, asset manager 5310 receives Manufacturing Data 3201 from equipment E210, from which the logical asset layout 5323 is generated. In this example from FIG. 2, equipment E210 sends manufacturing data before the breakdown. Subsequently, equipment E210 malfunctions and is replaced by equipment E211, which submits manufacturing data 3202. Asset manager 5310 determines that equipment E211 is new to the logical asset layout, and generates logical asset layout 5324 to reflect the replacement of equipment E210 with equipment E211. That is, asset manager 5310 adds a connection between operation OP210 and equipment 211 as illustrated in FIG. 5. The layout can then be stored based on the configuration as indicated in FIG. 3.

Figure 6:
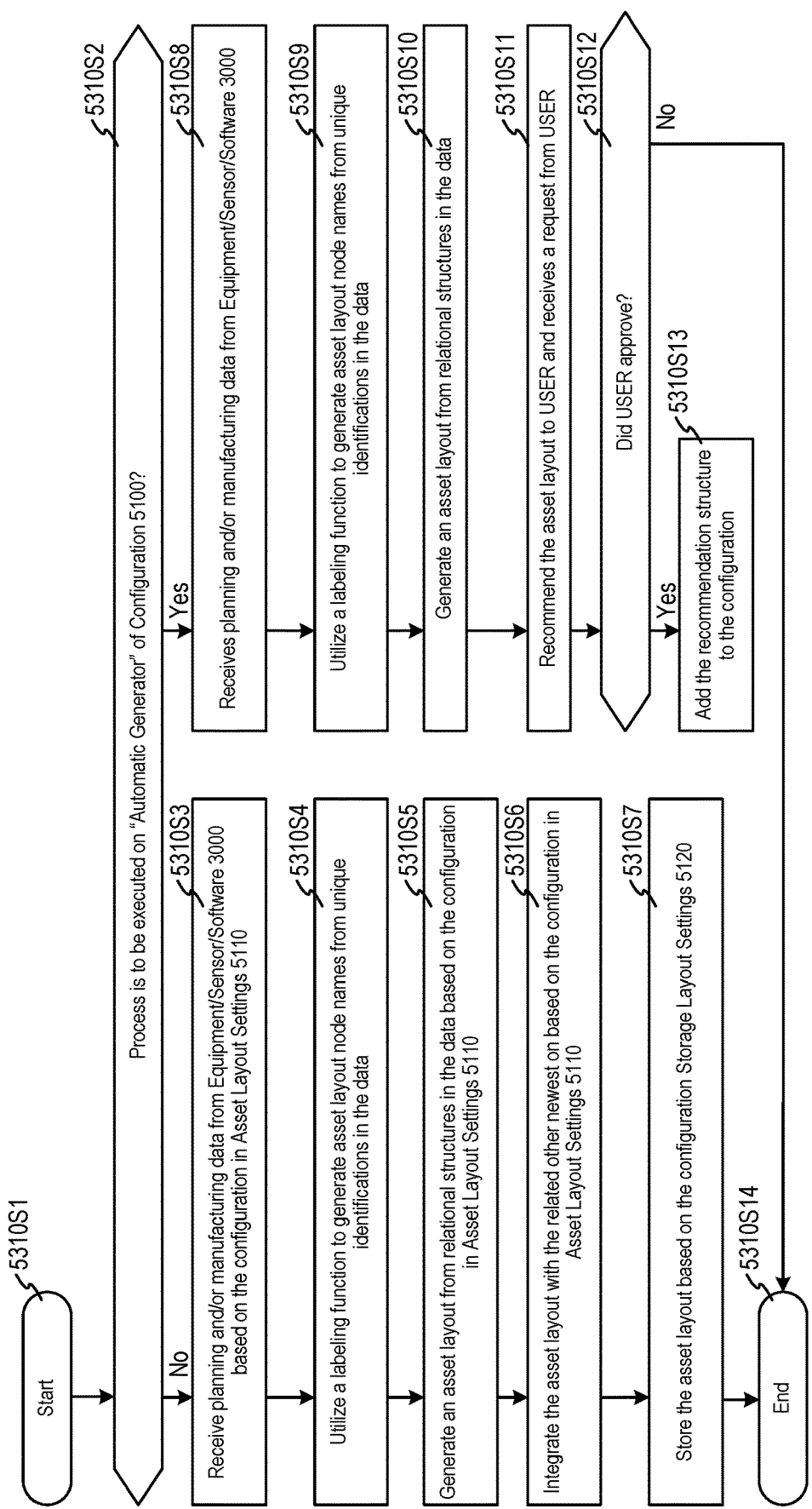
FIG. 6 illustrates a flowchart for asset manager, in accordance with an example implementation.

FIG. 6 illustrates a flowchart for asset manager 5310, in accordance with an example implementation. The flow begins at 5310S1 when the asset manager 5310 is to execute a process.

At 5310S2, the asset manager 5310 reviews the configuration 5100 provided in FIG. 3 to determine if the process to be executed is to be directed to the automatic generator. That is, configuration 5100 is reviewed to determine if the automatic generation flag is set to yes.

If not (No), then the flow proceeds to 5310S3 to receive planning and/or manufacturing data from Equipment/Sensor/Software 3000 based on the configuration provided at Asset Layout Settings 5110. At 5310S4, the asset manager 5310 utilizes a labeling function to generate asset layout node names from unique identifications in the data. In the example implementations of FIG. 6, the labeling function can be based from a hash table, from a function $y=f(x)$, or otherwise in accordance with the desired implementation. At 5310S5, the asset manager 5310 generates an asset layout from relational structures in the data based on the configuration indicated in the Asset Layout Settings 5110. At 5310S6, the asset manager 5310 integrates the asset layout with the related other newest information based on the configuration indicated in Asset Layout Settings 5110. At 5310S7, the asset manager 5310 stores the asset layout based on the configuration indicated in Storage Layout Settings 5120, and ends the flow at 5310S14.

Otherwise (Yes), the asset manager 5310 receives planning and/or manufacturing data from the Equipment/Sensor/Software 3000 at 5310S8. At 5310S9, the asset manager 5310 uses a labeling function to generate asset layout node names from unique identifications in the data. At 5310S10, the asset manager 5310 generates an asset layout from relational structures in the data. At 5310S11, the asset manager 5310 recommends the asset layout to the USER and receives a request from the USER. At 5310S12, a determination is made as to whether USER approval was received. If not (No), the flow ends at 5310S14, otherwise (Yes), the asset manager 5310 adds the recommendation structure to the configuration at 5310S13.

Figure 7:
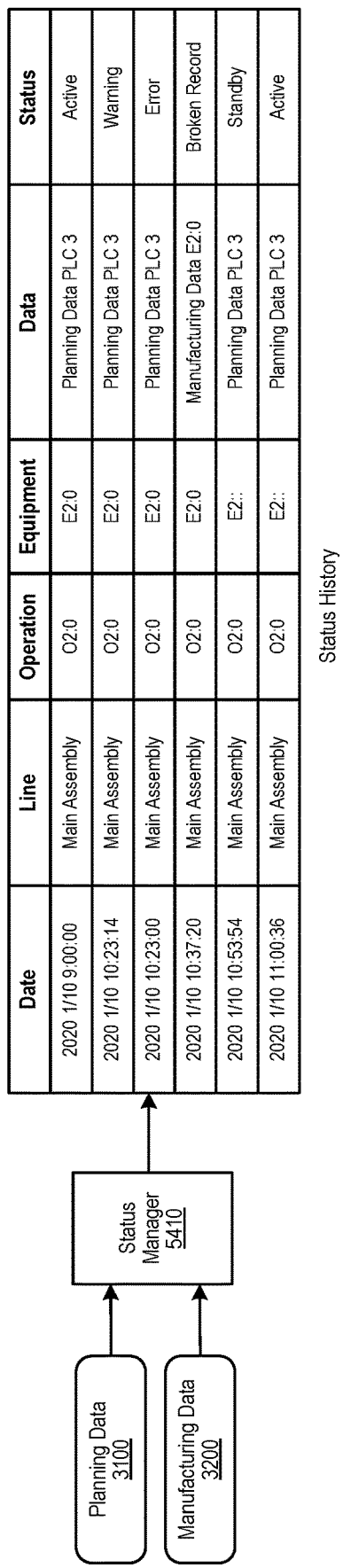
FIG. 7 illustrates an overview of the status manager, in accordance with an example implementation.

FIG. 7 illustrates an overview of the status manager 5410 in accordance with an example implementation. Status manager 5410 manages status history 5420 based on storage layout settings 5120. Status history 5410 receives planning data 3100 and manufacturing data 3200 and parses the status history 5420 according to the storage layout settings 5120. In the example of FIG. 7, the status history 5420 involves date, line, operation, equipment, data and status.

Figure 8:
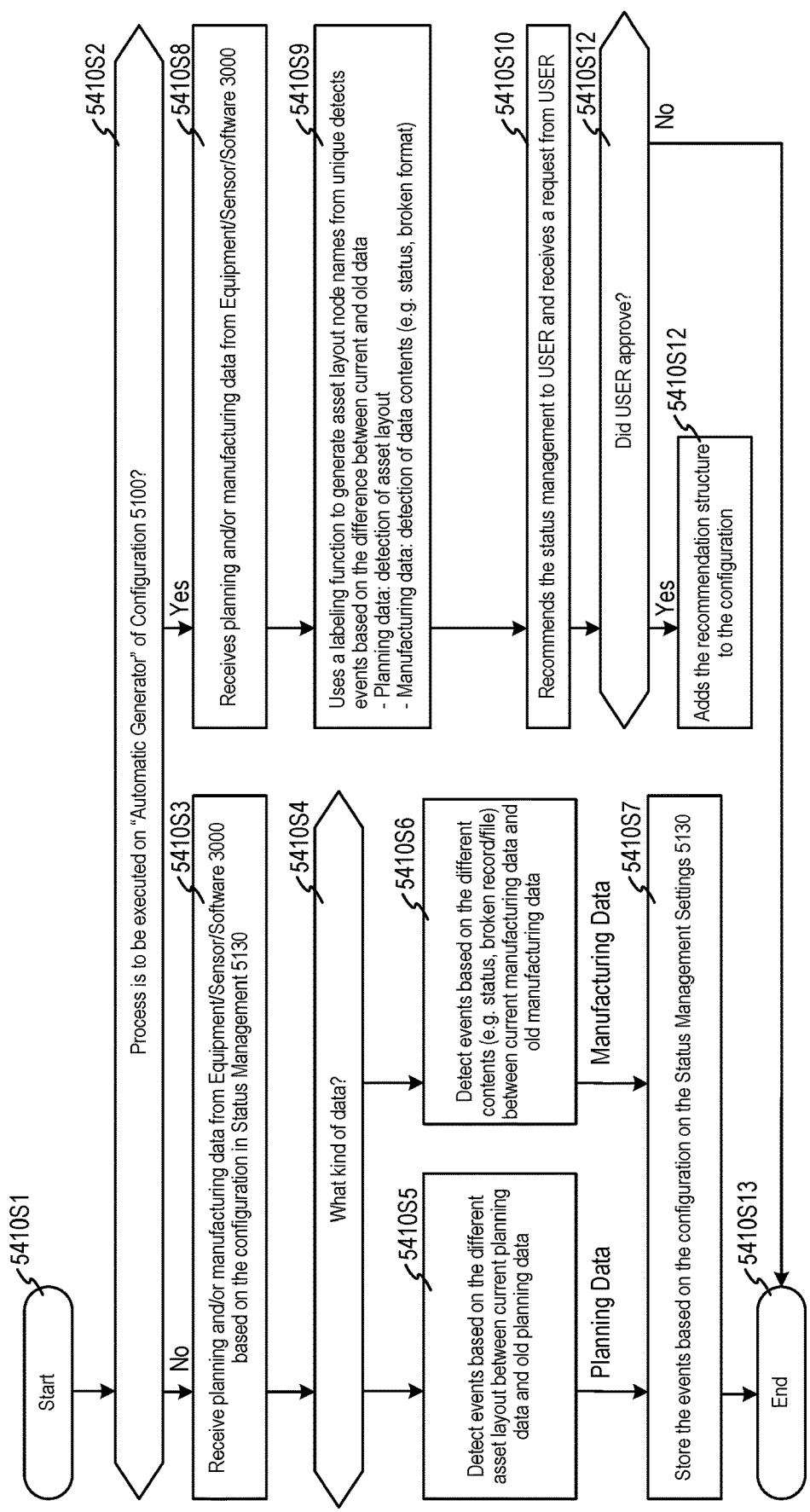
FIG. 8 illustrates a flow chart for the status manager, in accordance with an example implementation.

FIG. 8 illustrates a flow chart for the status manager 5410, in accordance with an example implementation. The status manager 5410 begins the flow at 5410S1. At 5410S2, the status manager 5410 reviews configuration 5100 to determine whether the process to be executed is to be directed to the automatic generator. That is, configuration 5100 is reviewed to determine if the automatic generation flag is set to yes.

If not (No), then the status manager 5410 receives planning and/or manufacturing data from Equipment/Sensor/Software 3000 based on the configuration indicated at the Status Management 5130 at 5410S3.

At 5410S4, a determination is made is to what type of data is received. If the data is planning data, then the status manager 5410 proceeds to 5410S5 and detects events based on the different asset layout between the current planning data and the old planning data. Otherwise, if the data is manufacturing data, the status manager 5410 proceeds to 5410S6 and detects events based on the different contents (e.g. status, broken record/file) between the current manufacturing data and the old manufacturing data. At 5410S7, the status manager 5410 stores the events based on the configuration indicated in Status Management Settings 5130, and ends the process at 5410S13.

Otherwise (Yes), the status manager 5410 receives planning and/or manufacturing data from the Equipment/Sensor/Software 3000 at 5410S8. At 5410S9, the status manager 5410 uses a labeling function to generate asset layout node names from unique detected events based on the difference between the current and old data. From the planning data, the status manager 5410 conducts a detection of the asset layout. From the manufacturing data, the status manager 5410 conducts a detection of data contents (e.g. status, broken format).

At 5410S10, the status manager 5410 recommends the status management to the USER and receives a request from USER. At 5410S11, a determination is made as to whether USER approval was received. If so (Yes), then the status manager 5410 adds the recommendation structure to the configuration at 5410S12, otherwise (No) the process ends at 5410S13.

Figure 9:
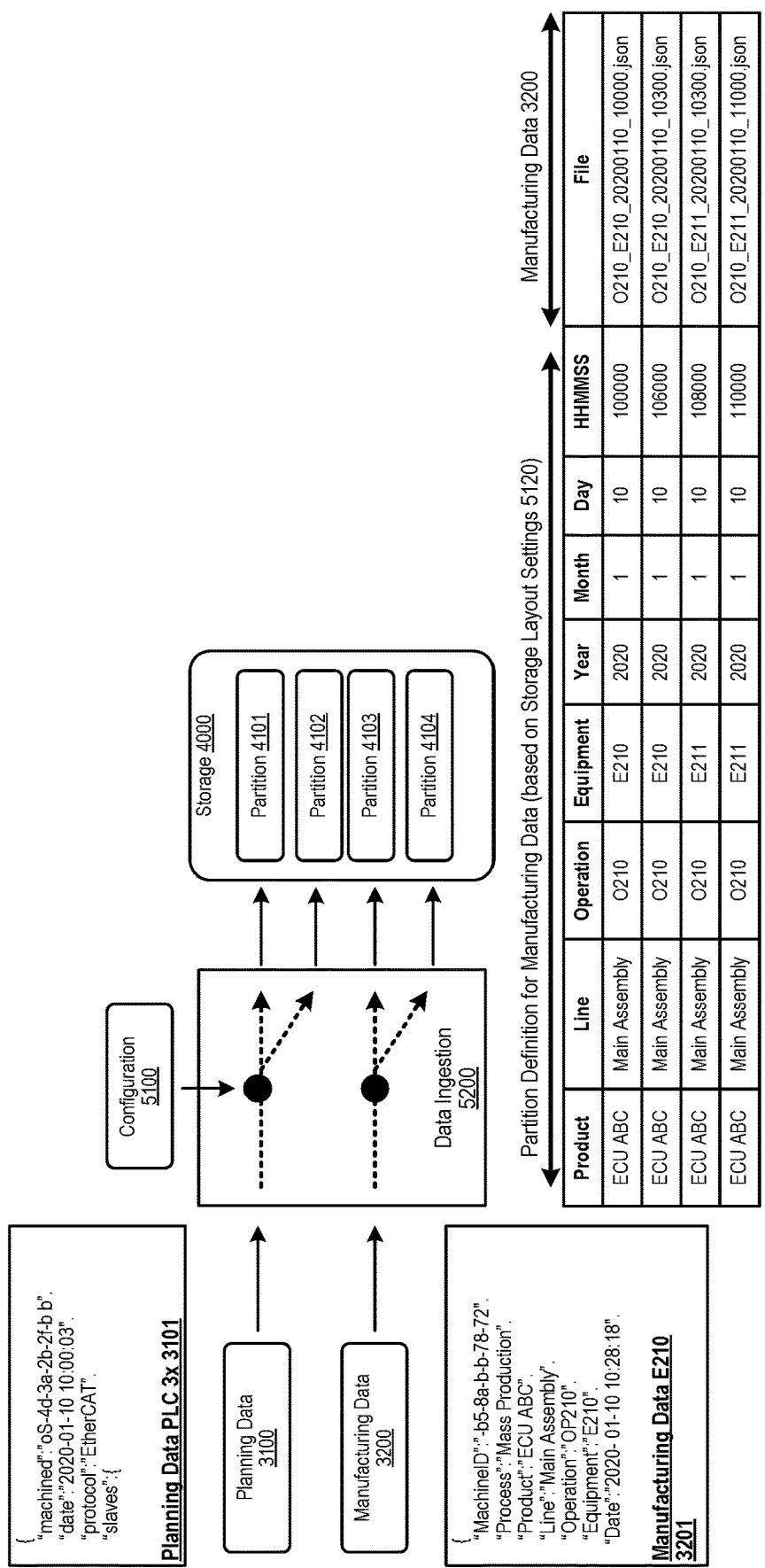
FIG. 9 illustrates an example overview for data ingestion, in accordance with an example implementation.

FIG. 9 illustrates an example overview for data ingestion, in accordance with an example implementation. Specifically, FIG. 9 illustrates an example of processing of planning data 3100 and manufacturing data 3200 by data ingestion 5200 into the various partitions 4101, 4102, 4103, and 4104 in storage 4000. Data ingestion 5200 parses each received planning data 3100 (e.g., planning data PLC 3x 3101) and manufacturing data 3200 (e.g., manufacturing data E210 3201) into partitions 4101, 4102, 4103, 4104 according to configuration 5100 (in particular, storage layout settings 5120).

Figure 10:
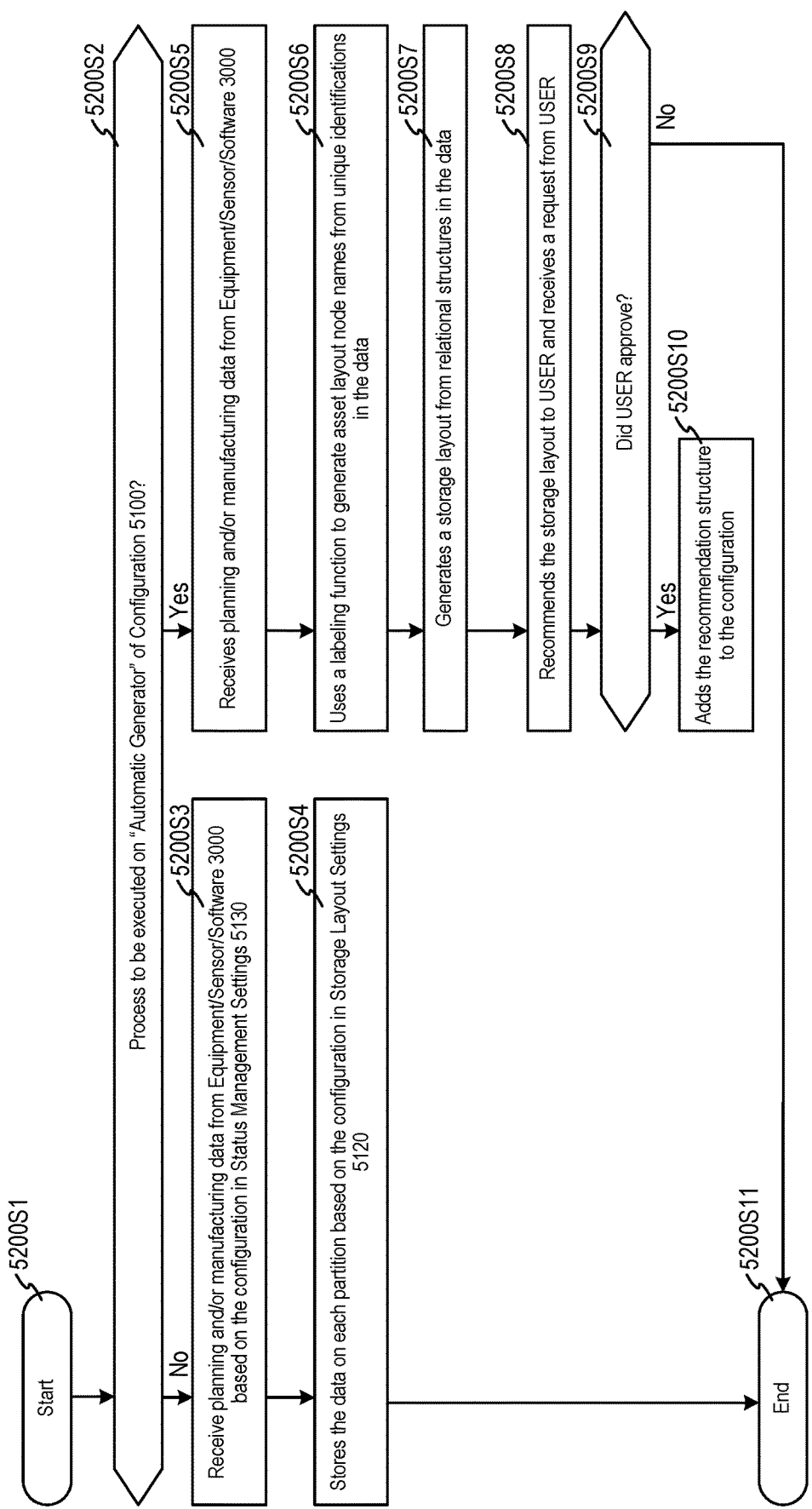
FIG. 10 illustrates a flow diagram for data ingestion, in accordance with an example implementation.

FIG. 10 illustrates a flow diagram for data ingestion, in accordance with an example implementation. The data ingestion 5200 starts the process at 5200S1. At 5200S2, the data ingestion 5200 reviews configuration 5100 to determine whether the process to be executed is to be directed to the automatic generator.

If not (No), the process proceeds to 5200S3 wherein the data ingestion 5200 receives planning and/or manufacturing data from Equipment/Sensor/Software 3000 based on the configuration provided in Status Management Settings 5130. At 5200S4, the data ingestion 5200 stores the data on each partition based on the configuration provided in Storage Layout Settings 5120 and ends the process at 5200S11.

Otherwise (Yes), data ingestion 5200 receives planning and/or manufacturing data from Equipment/Sensor/Software 3000 at 5200S5. At 5200S6, data ingestion 5200 uses a labeling function to generate asset layout node names from unique identifications in the data. At 5200S7, data ingestion 5200 generates a storage layout from relational structures in the data.

At 5200S8, the data ingestion 5200 recommends the storage layout to USER and receives a request from the USER. At 5200S9, a determination is made as to whether the USER approved the recommendation. If so (Yes), then data ingestion 5200 adds the recommendation structure to the configuration 5200S10, otherwise (No), the process ends at 5200S11.

Figure 11:
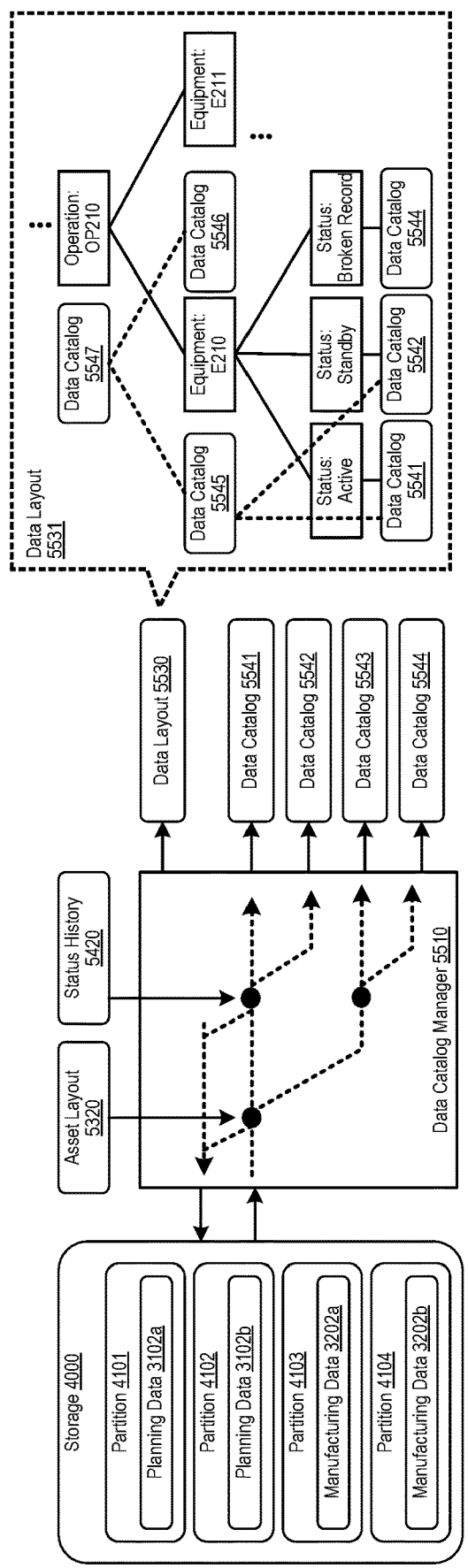
FIG. 11 illustrates an overview of the data catalog manager, in accordance with an example implementation.

FIG. 11 illustrates an overview of the data catalog manager, in accordance with an example implementation. Data catalog manager 5510 manages the data layout 5530 with the corresponding data catalogs 5541, 5542, 5543, 5544. Based on the partitioned planning data 3102a, 3102b and manufacturing data 3202a, 3202b, along with the asset layout 5320 and status history 5420, the data catalog manager 5510 forms the relationship between the data layout and data catalog. In the example of FIG. 11, data catalog manager 5510 generates data layout 5531 that associates equipment, operations, and status histories with corresponding data catalogs, which can be derived from data catalogs along the hierarchy such as data catalog 5545, 5546, and 5547.

Figure 12:
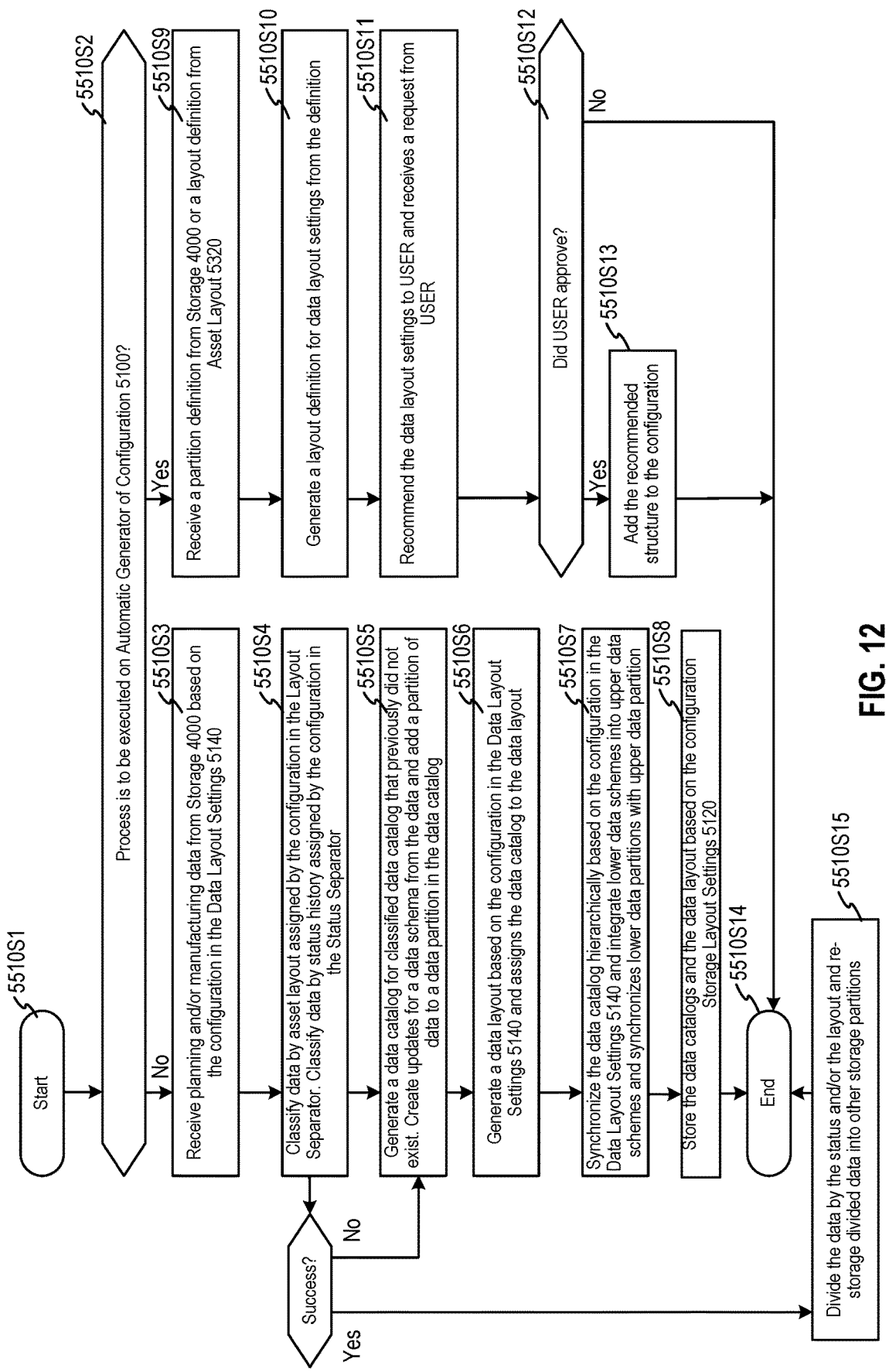
FIG. 12 illustrates an example flow of the data catalog manager, in accordance with an example implementation.

FIG. 12 illustrates an example flow of the data catalog manager 5510, in accordance with an example implementation. The data catalog manager 5510 starts the process at 5510S1. At 5510S2, the data catalog manager 5510 reviews configuration 5100 to determine whether the process to be executed is to be directed to the automatic generator.

If not (No), then the data catalog manager 5510 receives planning and/or manufacturing data from Storage 4000 based on the configuration in Data Layout Settings 5140 at 5510S3. At 5510S4, the data catalog manager 5510 classifies data by an asset layout assigned by the configuration in the Layout Separator. The data catalog manager 5510 classifies data by the status history assigned by the configuration in the Status Separator. If the classification is successful (Yes), then the data catalog manager 5510 divides the data according to the status and/or the layout defined in the configuration at 5510S15. Data catalog manager 5510 re-storages divided data into other storage partitions 5510S15. Otherwise (No), the data catalog manager 5510 generates a data catalog for a classified data catalog that did not exist previously at 5510S5. The data catalog manager 5510 creates or updates a data schema from the data and adds a partition of data to a data partition in the data catalog 5510S5. At 5510S6, the data catalog manager 5510 generates a data layout based on the configuration in the data layout settings 5140 and assigns the data catalog to the data layout. At 55107, the data catalog manager 5510 synchronizes the data catalog hierarchically based on the configuration in the Data Layout Settings 5140 and integrate lower data schemes into upper data schemes and synchronizes lower data partitions with upper data partition.

Otherwise (Yes), the data catalog manager 5510 receives a partition definition from Storage 4000 or a layout definition from Asset Layout 5320 at 5510S9. At 5510S10, the data catalog manager generates a layout definition for data layout settings from the definition. In the case of a partition definition, the layout definition is derived from the settings indicated in the partition definition. At 5510S11, the data catalog manager 5510 recommends the data layout settings to the USER and receives a request from USER. At 5510S12, a determination is made as to whether the USER approved. If so (Yes), then the data catalog manager 5510 adds the recommendation structure to the configuration at 5510S13, and ends the flow at 5510S14.

Figure 13:
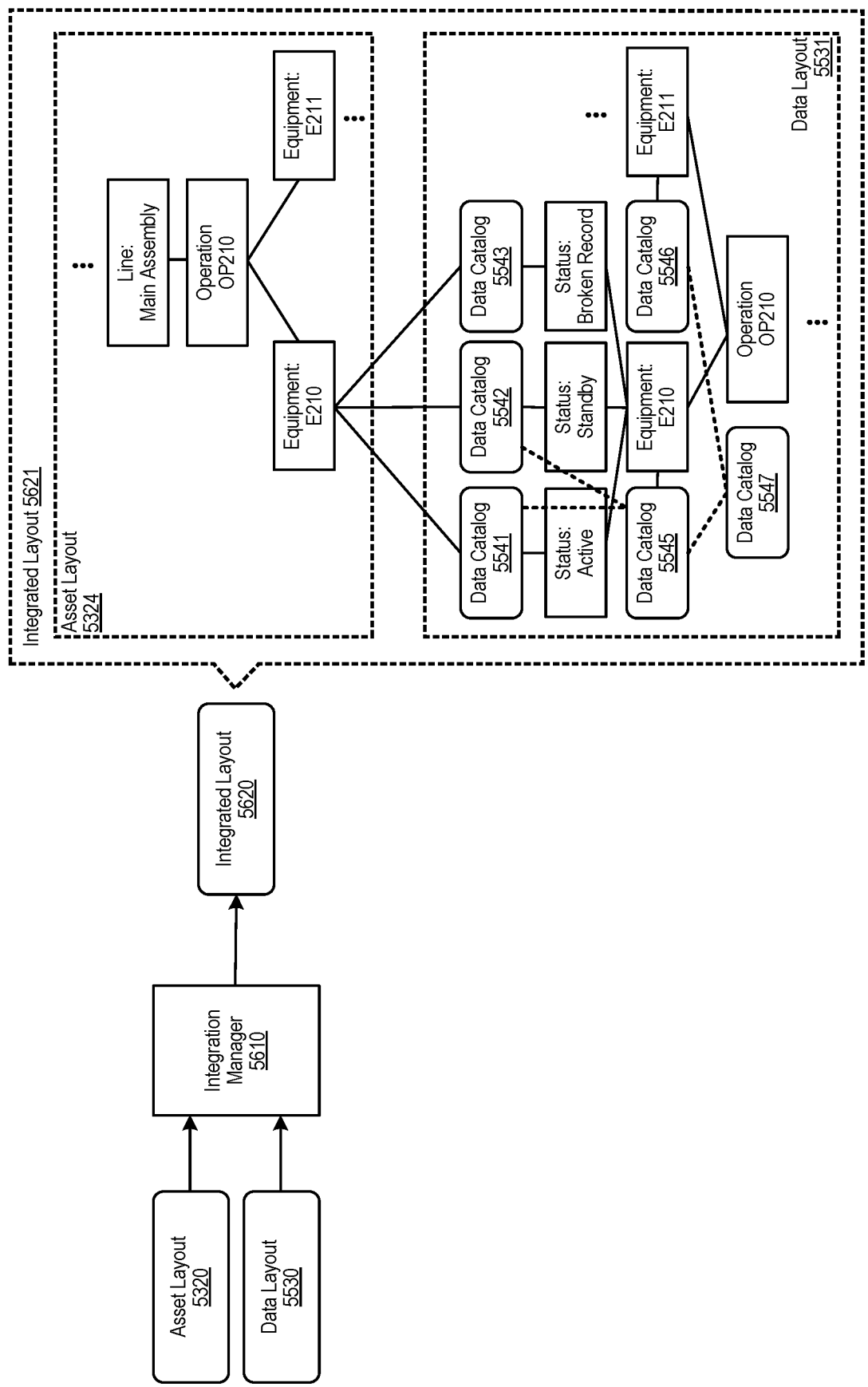
FIG. 13 illustrates an overview of the integration manager, in accordance with an example implementation.

FIG. 13 illustrates an overview of the integration manager, in accordance with an example implementation. The integration manager is configured to generate an integrated layout 5621 that serves as the basis of the cyber-physical layout as illustrated in FIGS. 1(E) to 1(J). Integrated layout 5621 is formed from the asset layout 5320 and the data layout 5530, and is generated by the integration manager 5610. Integration manager 5610 intakes asset layout 5320 and data layout 5530 together to form integrated layout 5620. In an example, integrated layout 5621 includes asset layout 5324, which is linked hierarchically to data layout 5531 that associates the corresponding data catalogs and status history to an equipment, which is linked to an operation by asset layout 5324.

Figure 14:
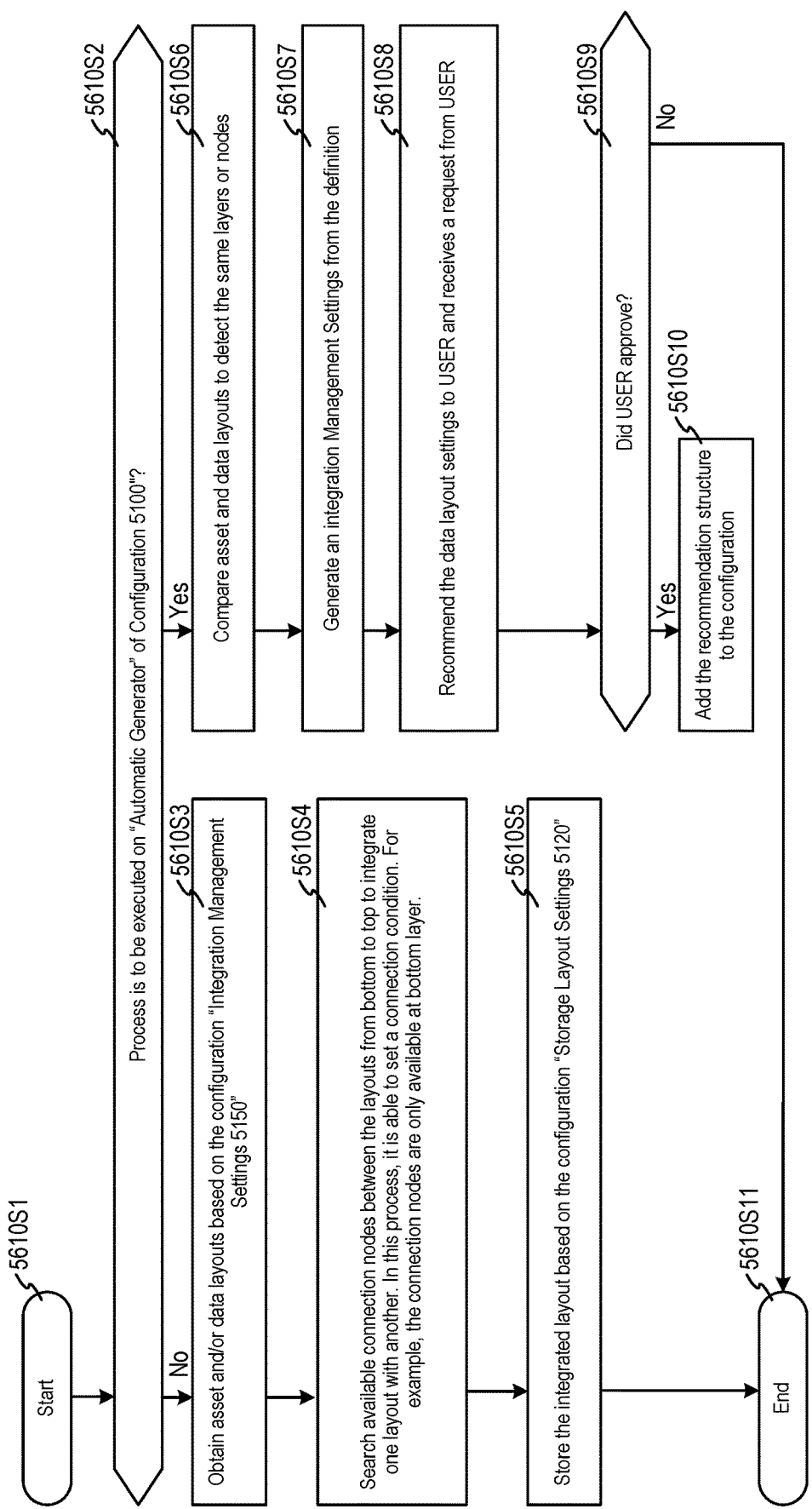
FIG. 14 illustrates a flow diagram for an integration manager, in accordance with an example implementation.

FIG. 14 illustrates a flow diagram for an integration manager, in accordance with an example implementation. The integration manager 5610 begins the flow at 5610S1. At 5610S2, the integration manager 5610 reviews configuration 5100 to determine whether the process to be executed is to be directed to the automatic generator.

If not (No), the integration manager 5610 obtains the asset and/or data layouts based on the configuration indicated in the Integration Management Settings 5150 at 5610S3. At 5610S4, the integration manager 5610 searches for available connection nodes between the layouts from bottom to top to integrate one layout with another. In this process, the integration manager 5610 also sets a connection condition in accordance with the desired implementation (e.g., the connection nodes are only available at bottom layer). At 5610S5, the integration manager 5610 stores the integrated layout based on the configuration in the Storage Layout Settings 5120. The flow then ends at 5610S11.

Otherwise (Yes), the integration manager 5610 compares asset and data layouts to detect the same layers or nodes at 5610S6. Integration manager 5610 then generates integration management settings from the definition at 5610S7. At 5610S8, the integration manager 5610 recommends the data layout settings to USER and receives a request from USER. At 5610S9, a determination is made as to whether the USER approved. If so (Yes), then the integration manger 5610 adds the recommendation structure to the configuration at 5610S10.

Example implementations described herein manage asset layouts and data layouts on the digital twin (e.g. IIoT, CPS) every event to control asset (manufacturing equipment), data and applications. Further, the example implementations integrate asset layouts with data layouts to search/update components from user of asset, data or application. For example, USER (e.g. worker, db admin) can understand how planning and manufacturing data are utilized by another user. Application USER/Engineer can understand how/where data is generated by another user and equipment. Hence the example implementations control cyber and physical manufacturing process using asset and data layouts to improve manufacturing efficiency based on application results.

Figure 15:
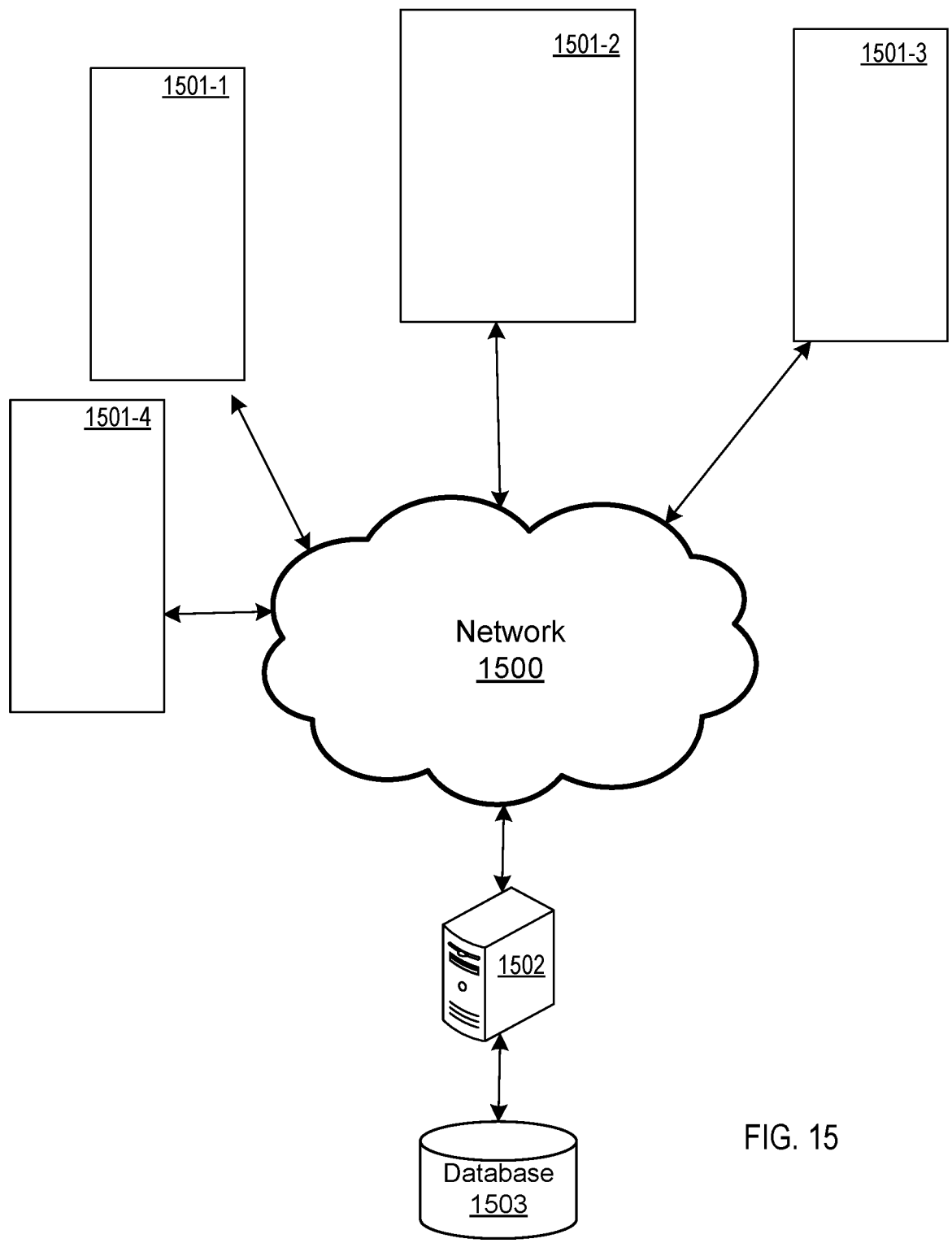
FIG. 15 illustrates a system involving a plurality of systems with connected sensors and a management apparatus, in accordance with an example implementation.

FIG. 15 illustrates a system involving a plurality of systems with connected sensors and a management apparatus, in accordance with an example implementation. One or more systems with connected sensors 1501-1, 1501-2, 1501-3, and 1501-4 are communicatively coupled to a network 1500 which is connected to a management apparatus 1502, which facilitates functionality for an Internet of Things (IoT) gateway or other manufacturing management system. The management apparatus 1502 manages a database 1503, which contains historical data collected from the sensors of the systems 1501-1, 1501-2, 1501-3, and 1501-4. In alternate example implementations, the data from the sensors of the systems 1501-1, 1501-2, 1501-3, 1501-4 and can be stored to a central repository or central database such as proprietary databases that intake data such as enterprise resource planning systems, and the management apparatus 1502 can access or retrieve the data from the central repository or central database. Such systems can include robot arms with sensors, turbines with sensors, lathes with sensors, and so on in accordance with the desired implementation.

Figure 16:
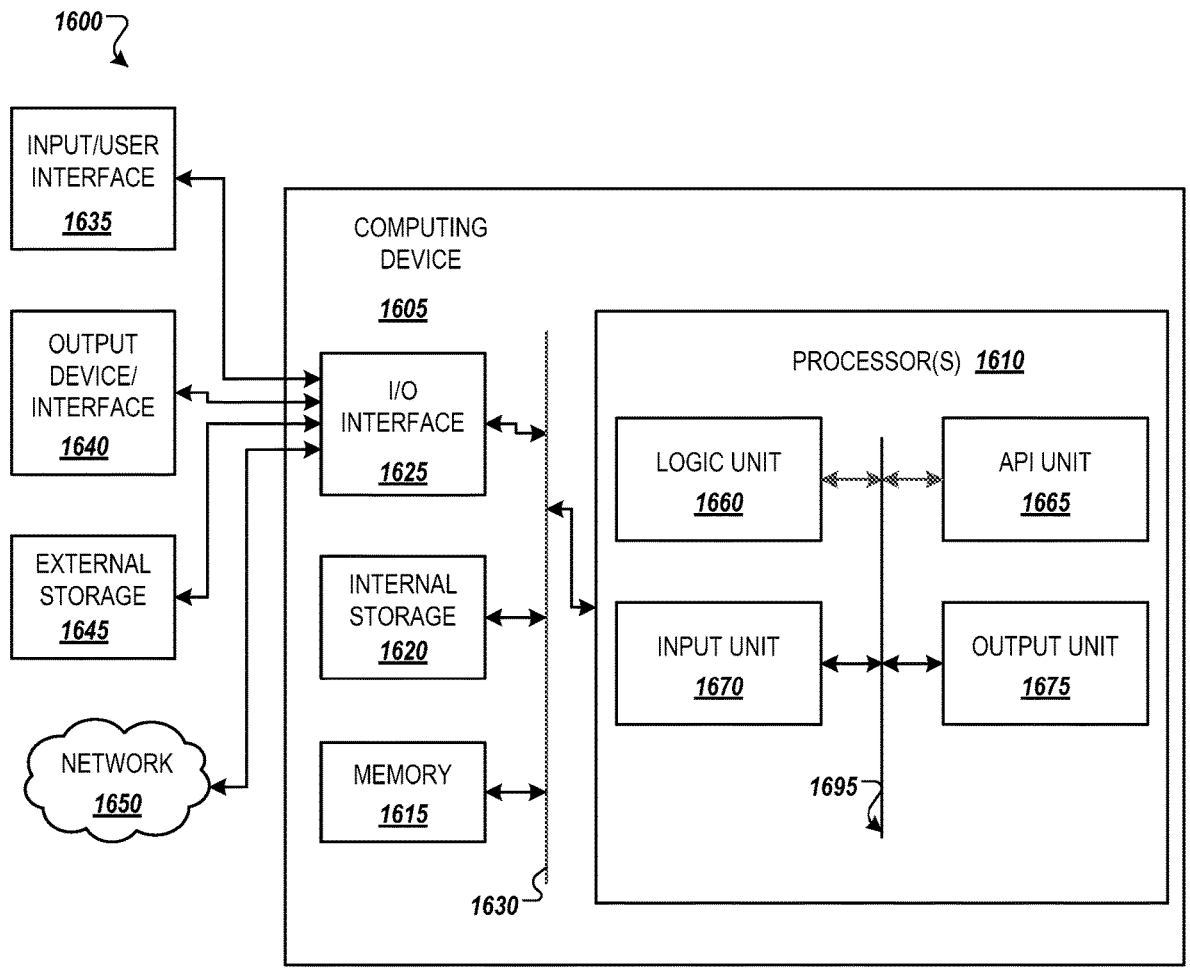
FIG. 16 illustrates an example computing environment with an example computer device suitable for use in some example implementations.

FIG. 16 illustrates an example computing environment with an example computer device suitable for use in some example implementations, such as a management apparatus 1502 as illustrated in FIG. 15 to facilitate the platform for the digital twin management 5000.

Computer device 1605 in computing environment 1600 can include one or more processing units, cores, or processors 1610, memory 1615 (e.g., RAM, ROM, and/or the like), internal storage 1620 (e.g., magnetic, optical, solid state storage, and/or organic), and/or I/O interface 1625, any of which can be coupled on a communication mechanism or bus 1630 for communicating information or embedded in the computer device 1605. I/O interface 1625 is also configured to receive images from cameras or provide images to projectors or displays, depending on the desired implementation.

Computer device 1605 can be communicatively coupled to input/user interface 1635 and output device/interface 1640. Either one or both of input/user interface 1635 and output device/interface 1640 can be a wired or wireless interface and can be detachable. Input/user interface 1635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1640 may include a display, television, monitor, printer, speaker, braille, or the like. In some example implementations, input/user interface 1635 and output device/interface 1640 can be embedded with or physically coupled to the computer device 1605. In other example implementations, other computer devices may function as or provide the functions of input/user interface 1635 and output device/interface 1640 for a computer device 1605.

Examples of computer device 1605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1605 can be communicatively coupled (e.g., via I/O interface 1625) to external storage 1645 and network 1650 for communicating with any number of networked components, devices, and systems, including one or more computer devices of the same or different configuration. Computer device 1605 or any connected computer device can be functioning as, providing services of, or referred to as a server, client, thin server, general machine, special-purpose machine, or another label.

I/O interface 1625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1600. Network 1650 can be any network or combination of networks (e.g., the Internet, local area network, wide area network, a telephonic network, a cellular network, satellite network, and the like).

Computer device 1605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1610 can execute under any operating system (OS) (not shown), in a native or virtual environment. One or more applications can be deployed that include logic unit 1660, application programming interface (API) unit 1665, input unit 1670, output unit 1675, and inter-unit communication mechanism 1695 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1665, it may be communicated to one or more other units (e.g., logic unit 1660, input unit 1670, output unit 1675). In some instances, logic unit 1660 may be configured to control the information flow among the units and direct the services provided by API unit 1665, input unit 1670, output unit 1675, in some example implementations described above. For example, the flow of one or more processes or implementations may be controlled by logic unit 1660 alone or in conjunction with API unit 1665. The input unit 1670 may be configured to obtain input for the calculations described in the example implementations, and the output unit 1675 may be configured to provide output based on the calculations described in example implementations.

Processor(s) 1610 can be configured to relate an asset layout of the plurality of systems with a data layout of the plurality of systems, the asset layout managing the plurality of systems at an equipment level, a line level and an operation level, the data layout managing data catalogs at the equipment level, the line level, and the operation level.

Processor(s) 1610 can be configured to generate the data layout from the asset layout, the generating the data layout from the asset layout by retrieving a layout definition from the asset layout; generating a layout definition for data layout settings from the layout definition retrieved from the asset layout; incorporating the data layout settings into a configuration for the plurality of systems; and generating the data layout and corresponding data catalogs from the data layout settings.

Processor(s) 1610 are configured to, for receipt of new planning data, detect one or more events based on a difference between another asset layout associated with the new planning data and the asset layout; and store the detected one or more events into a configuration for the plurality of systems; and providing the one or more detected events to asset users at the equipment level, a line level and an operation level, and data users at the equipment level, the line level, and the operation level.

Processor(s) 1610 are configured to, for detecting of one or more events based on a difference between another asset layout associated with the new planning data and the asset layout, generate asset layout node names for nodes in the equipment level in the another asset layout based on the detected one or more events; detect a difference between previous manufacturing data from the plurality of sensors and current manufacturing data obtained from the plurality of sensors; and update the data catalogs based on the difference between the previous manufacturing data and the current manufacturing data.

Processor(s) 1610 are configured to generate a visualization of the relating of the asset layout with the data layout, the visualization including an asset hierarchy representation of the asset layout and the data layout at the equipment level, the line level, and the operation level, and relationships between the asset layout and the data layout at the equipment level, the line level, and the operation level.

Processor(s) 1610 can be configured to relate the asset layout with the data layout can involve integrating the asset layout with the data layout to generate a cyber-physical layout.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for management of a plurality of systems comprising a plurality of sensors, the method comprising:
   generating a data layout of the plurality of systems from an asset layout of the plurality of systems, the generating a data layout from an asset layout comprising:
      retrieving a layout definition from the asset layout;
      generating a layout definition for data layout settings from the layout definition retrieved from the asset layout;
      incorporating the data layout settings into a configuration for the plurality of systems; and
      generating the data layout and corresponding data catalogs from the data layout settings;
   relating the asset layout of the plurality of systems with the data layout of the plurality of systems, the asset layout managing the plurality of systems at an equipment level, a line level and an operation level, the data layout managing data catalogs at the equipment level, the line level, and the operation level, wherein the relating the asset layout with the data layout comprises integrating the asset layout with the data layout to generate cyber-physical layout that relates assets from the asset layout, data from the data layout, and executed applications of the plurality of systems; and
   sending notifications of detected events to a corresponding asset user or data user according to the cyber-physical layout.

2. The method of claim 1, further comprising, for receipt of new planning data:
   detecting one or more events based on a difference between another asset layout associated with the new planning data and the asset layout; and
   storing the detected one or more events into a configuration for the plurality of systems; and
   providing the one or more detected events to asset users at the equipment level, a line level and an operation level, and data users at the equipment level, the line level, and the operation level.

3. The method of claim 1, further comprising, for detecting of one or more events based on a difference between another asset layout associated with new planning data and the asset layout:
   generating asset layout node names for nodes in the equipment level in the another asset layout based on the detected one or more events;
   detecting a difference between previous manufacturing data from the plurality of sensors and current manufacturing data obtained from the plurality of sensors;
   updating the data catalogs based on the difference between the previous manufacturing data and the current manufacturing data.

4. The method of claim 1, further comprising generating a visualization of the relating of the asset layout with the data layout, the visualization comprising an asset hierarchy representation of the asset layout and the data layout at the equipment level, the line level, and the operation level, and relationships between the asset layout and the data layout at the equipment level, the line level, and the operation level.

5. A non-transitory computer readable medium, storing instructions for executing a process for management of a plurality of systems comprising a plurality of sensors, the instructions comprising:

generating a data layout of the plurality of systems from an asset layout of the plurality of systems, the generating a data layout from an asset layout comprising:
retrieving a layout definition from the asset layout;
generating a layout definition for data layout settings from the layout definition retrieved from the asset layout;
incorporating the data layout settings into a configuration for the plurality of systems; and
generating the data layout and corresponding data catalogs from the data layout settings;
relating the asset layout of the plurality of systems with the data layout of the plurality of systems, the asset layout managing the plurality of systems at an equipment level, a line level and an operation level, the data layout managing data catalogs at the equipment level, the line level, and the operation level, wherein the relating the asset layout with the data layout comprises integrating the asset layout with the data layout to generate a cyber-physical layout that relates assets from the asset layout, data from the data layout, and executed applications of the plurality of systems; and
sending notifications of detected events to a corresponding asset user or data user according to the cyber-physical layout.

6. The non-transitory computer readable medium of claim 5, the instructions further comprising, for receipt of new planning data:
detecting one or more events based on a difference between another asset layout associated with the new planning data and the asset layout; and
storing the detected one or more events into a configuration for the plurality of systems; and
providing the one or more detected events to asset users at the equipment level, a line level and an operation level, and data users at the equipment level, the line level, and the operation level.

7. The non-transitory computer readable medium of claim 5, the instructions further comprising, for detecting of one or more events based on a difference between another asset layout associated with new planning data and the asset layout:
generating asset layout node names for nodes in the equipment level in the another asset layout based on the detected one or more events;
detecting a difference between previous manufacturing data from the plurality of sensors and current manufacturing data obtained from the plurality of sensors;
updating the data catalogs based on the difference between the previous manufacturing data and the current manufacturing data.

8. The non-transitory computer readable medium of claim 5, the instructions further comprising generating a visualization of the relating of the asset layout with the data layout, the visualization comprising an asset hierarchy representation of the asset layout and the data layout at the equipment level, the line level, and the operation level, and relationships between the asset layout and the data layout at the equipment level, the line level, and the operation level.

9. An apparatus configured to facilitate management of a plurality of systems comprising a plurality of sensors, the apparatus comprising:
a processor, configured to:
generate a data layout of the plurality of systems from an asset layout of the plurality of systems, the generating a data layout from an asset layout by:
retrieving a layout definition from the asset layout;
generating a layout definition for data layout settings from the layout definition retrieved from the asset layout;
incorporating the data layout settings into a configuration for the plurality of systems; and
generating the data layout and corresponding data catalogs from the data layout settings; and
relate the asset layout of the plurality of systems with the data layout of the plurality of systems, the asset layout managing the plurality of systems at an equipment level, a line level and an operation level, the data layout managing data catalogs at the equipment level, the line level, and the operation level, wherein the relating the asset layout with the data layout comprises integrating the asset layout with the data layout to generate a cyber-physical layout that relates assets from the asset layout, data from the data layout, and executed applications of the plurality of systems; and
send notifications of detected events to a corresponding asset user or data user according to the cyber-physical layout.

10. The apparatus of claim 9, the processor configured to, for receipt of new planning data:
detect one or more events based on a difference between another asset layout associated with the new planning data and the asset layout; and
store the detected one or more events into a configuration for the plurality of systems; and
provide the one or more detected events to asset users at the equipment level, a line level and an operation level, and data users at the equipment level, the line level, and the operation level.

11. The apparatus of claim 9, the processor configured to, for detecting of one or more events based on a difference between another asset layout associated with new planning data and the asset layout:
generate asset layout node names for nodes in the equipment level in the another asset layout based on the detected one or more events;
detect a difference between previous manufacturing data from the plurality of sensors and current manufacturing data obtained from the plurality of sensors;
update the data catalogs based on the difference between the previous manufacturing data and the current manufacturing data.

12. The apparatus of claim 9, the processor configured to generate a visualization of the relating of the asset layout with the data layout, the visualization comprising an asset hierarchy representation of the asset layout and the data layout at the equipment level, the line level, and the operation level, and relationships between the asset layout and the data layout at the equipment level, the line level, and the operation level.

* * * * *